(12) United States Patent
Duan et al.

(10) Patent No.: US 12,327,005 B2
(45) Date of Patent: Jun. 10, 2025

(54) DISPLAY METHOD AND ELECTRONIC DEVICE

(71) Applicant: HUAWEI TECHNOLOGIES CO., LTD., Guangdong (CN)

(72) Inventors: Yun Duan, Wuhan (CN); Yaling Ding, Shanghai (CN); Miao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/700,716

(22) PCT Filed: Oct. 19, 2022

(86) PCT No.: PCT/CN2022/126252
§ 371 (c)(1),
(2) Date: Apr. 12, 2024

(87) PCT Pub. No.: WO2023/078088
PCT Pub. Date: May 11, 2023

(65) Prior Publication Data
US 2025/0004607 A1  Jan. 2, 2025

(30) Foreign Application Priority Data

Nov. 3, 2021 (CN) .......................... 202111296371.5

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *G06F 3/0483* (2013.01);
(Continued)

(58) Field of Classification Search
CPC .. G06F 3/04817; G06F 3/0482; G06F 3/0483; G06F 3/04847; G06F 3/0486;
(Continued)

(56) References Cited

U.S. PATENT DOCUMENTS

| 2012/0030623 A1* | 2/2012 | Hoellwarth ......... G06F 3/04817 715/811 |
| 2012/0084732 A1 | 4/2012 | Filippov et al. |
| 2013/0332886 A1* | 12/2013 | Cranfill ................. G06F 3/0482 715/835 |

FOREIGN PATENT DOCUMENTS

| CN | 106257389 A | 12/2016 |
| CN | 111240789 A | 6/2020 |
| JP | 2014502740 A | 2/2014 |

OTHER PUBLICATIONS

Dad Dad, The problem with flipping large icon folders in the HarmonyOS system, https://tieba.baidu.com/p/7387214319, Jun. 5, 2021, 23 pages totally.

(Continued)

*Primary Examiner* — Premal R Patel

(57) ABSTRACT

The disclosure provides a display method and electronic device. In the method, an electronic device displays a first interface, where the first interface includes at least one control and a first folder, the control is displayed outside the first folder, the first folder includes a first page and a second page, the first page and the second page each include at least one application icon, and the first page is displayed on the first interface; the electronic device detects a first operation performed by a user on the first page of the first folder; and the electronic device displays a second interface in response to the first operation, where the second interface includes the at least one control and the second page.

20 Claims, 35 Drawing Sheets

(51) Int. Cl.
*G06F 3/0483* (2013.01)
*G06F 3/04847* (2022.01)
*G06F 3/0486* (2013.01)
*G06F 3/04886* (2022.01)
*G06F 9/451* (2018.01)

(52) U.S. Cl.
CPC ........ *G06F 3/04847* (2013.01); *G06F 3/0486* (2013.01); *G06F 3/04886* (2013.01); *G06F 9/451* (2018.02); *G06F 2203/04803* (2013.01)

(58) Field of Classification Search
CPC ................ G06F 3/04886; G06F 9/451; G06F 2203/04803; G06F 3/048; G06F 3/0481; G06F 3/0488; G06F 3/04883
See application file for complete search history.

(56) References Cited

OTHER PUBLICATIONS

Tabloid Library, How to turn pages in a large folder in Hongmeng system, Jun. 30, 2021, 2 pages.

\* cited by examiner

DISPLAY METHOD AND ELECTRONIC DEVICE

CROSS-REFERENCE TO RELATED APPLICATIONS

This application claims priority to Chinese Patent Application No. 202111296371.5, filed with the China National Intellectual Property Administration on Nov. 3, 2021 and entitled "DISPLAY METHOD AND ELECTRONIC DEVICE", which is incorporated herein by reference in its entirety.

TECHNICAL FIELD

This application relates to the field of terminal technologies, and in particular, to a display method and an electronic device.

BACKGROUND

Generally, to search for and use different applications (applications, APPs) more conveniently, a user classifies the apps for management. For example, apps of a same type may be placed in one folder. After the user taps the folder, all the apps in the folder can be displayed. In this case, the user can tap an application icon of an app to open the app. In the foregoing manner, to open an app, the user needs to first tap the folder, which is not convenient.

Based on this, a concept of large folder emerges in the HarmonyOS®. In the large folder, the user can directly tap an icon of an app to open the app, without expanding the folder. However, when a quantity of apps is greater than 8, to open a ninth app and more apps, the user needs to expand the large folder, and then slide on an expanded page to find an icon of an app that the user wants to open. In this case, user operations are complex, resulting in poor experience.

SUMMARY

This application provides a display method and an electronic device, to improve application opening efficiency, help a user search for an application, and improve user experience.

According to a first aspect, this application provides a display method. The method includes: An electronic device displays a first interface, where the first interface includes at least one control and a first folder, the control is displayed outside the first folder, the first folder includes a first page and a second page, the first page includes at least one application icon, the second page includes at least one application icon, and the first page is displayed on the first interface. Then, the electronic device detects a first operation performed by a user on the first page of the first folder. The electronic device displays a second interface in response to the first operation, where the second interface includes the at least one control and the second page. It should be understood that the second page is not displayed on the first interface.

In the foregoing technical solution, the user may perform an operation on the first page of the folder, to switch the first page of the folder to the second page, so as to implement page turning of the folder. An application can be found without expanding the folder, and then the application can be opened. In this way, it is convenient for the user to search for the application, and user experience is improved.

In a possible design, application icons on the second page include a part of application icons on the first page.

In a possible design, the first operation includes any one of the following operations: a slide operation at a position of an $N^{th}$ application icon on the first page of the first folder, where N is a positive integer; a slide operation in a first specified area of the first folder, where the first specified area includes any one of a left edge, a right edge, an upper edge, or a lower edge of the first folder; and a slide operation in any area of the first folder.

According to the foregoing technical solution, the electronic device may perform page turning on a page of the folder in response to slide operations performed by the user in different areas or positions, so that the user can search for an application.

In a possible design, that the electronic device displays a second interface in response to the first operation includes: The electronic device displays the part of the application icons of the first page on the second page of the first folder based on a sliding distance of the first operation in response to the first operation.

According to the foregoing technical solution, the electronic device may display the corresponding application icon based on the sliding distance of the first operation on the folder, so that user experience can be improved. For example, if the sliding distance is short, a part of the application icons of the first page may be displayed on the second page.

In a possible design, a quantity of application icons included in the first folder is greater than a preset quantity. The method further includes: The electronic device detects a second operation performed by the user at a position of a $P^{th}$ application icon on the first page; and the electronic device displays a third interface in response to the second operation, where the third interface includes a first application icon to an $M^{th}$ application icon on the first page, and M is greater than the preset quantity. A quantity of application icons that are in the first folder and that are able to be displayed on the third interface is greater than a quantity of application icons that are able to be displayed on the first page.

According to the foregoing technical solution, the electronic device may expand the first page of the folder in response to the second operation of the user. In this way, an application may be searched for on an expanded page, so that different use habits of different users can be satisfied, and user experience can be improved.

In a possible design, the method further includes: The electronic device detects a third operation performed by the user at a position of a $P^{th}$ application icon on the second page; and the electronic device displays a fourth interface in response to the third operation, where the fourth interface includes a first application icon to an $O^{th}$ application icon on the second page, or the fourth interface includes an $L^{th}$ application icon to an $O^{th}$ application icon on the second page, and L<P<O. A quantity of application icons that are in the first folder and that are able to be displayed on the fourth interface is greater than a quantity of application icons that are able to be displayed on the second page.

According to the foregoing technical solution, the electronic device may expand the second page of the folder in response to the third operation of the user. In this way, the user can search for an application on an expanded page, and does not need to repeatedly perform a page turning operation. This improves user experience.

In a possible design, that the electronic device displays a second interface in response to the first operation includes:

When the quantity of application icons included in the first folder is greater than the preset quantity, the electronic device displays the second interface in response to the first operation.

In a possible design, the preset quantity is 8 or 9.

According to the foregoing technical solution, when the quantity of application icons included in the folder is greater than 8 or 9, the electronic device may turn a page of the folder in response to the first operation.

In a possible design, an icon of a first application is displayed on the first page, and the method further includes: The electronic device detects a fourth operation performed on the icon of the first application on the first interface; and the electronic device opens the first application in response to the fourth operation.

According to the foregoing technical solution, an application can be opened without expanding the folder. This improves application opening efficiency and improves user experience.

In a possible design, the quantity of application icons included in the first folder is greater than the preset quantity, and the first page includes icons displayed in an overlapping manner.

It should be understood that, in an actual product implementation, the icons displayed in the overlapping manner may be included, or the icons displayed in the overlapping manner may not be included. For example, the icons may be normally displayed. Certainly, there may be another display effect. This is not limited in this application.

In a possible design, that the electronic device detects a first operation performed by a user on the first page of the first folder includes: The electronic device detects the first operation performed by the user on the icons displayed in the overlapping manner. The icons displayed in the overlapping manner are displayed as a plurality of non-overlapped icons on the second interface.

According to the foregoing technical solution, the user may perform the first operation at a position of the application icons displayed in the overlapping manner, and the electronic device may expand, on the second interface in response to the first operation of the user, the application icons displayed in the overlapping manner. In other words, the icons displayed in the overlapping manner may be displayed as a plurality of non-overlapped icons on the second interface. In this way, the user can conveniently search for an application, and does not need to tap the overlapped application icons to expand the folder. This can improve application search efficiency.

In a possible design, the method further includes: The electronic device detects a fifth operation performed by the user on the second page of the first folder; and the electronic device displays the first page of the first folder in response to the fifth operation.

According to the foregoing technical solution, the user may perform an operation on the second page of the folder, and the electronic device displays the first page of the folder in response to the operation of the user, to slide the second page back to the first page.

According to a second aspect, this application provides an electronic device. The electronic device includes a display, one or more processors, one or more memories, one or more sensors, a plurality of applications, and one or more computer programs. The one or more computer programs are stored in the one or more memories, the one or more computer programs include instructions, and when the instructions are invoked and executed by the one or more processors, the electronic device is enabled to perform the method according to any one of the first aspect and the possible designs of the first aspect.

According to a third aspect, this application further provides an electronic device. The electronic device includes modules/units that are configured to perform the method according to the first aspect or any possible design of the first aspect. The modules/units may be implemented by hardware, or may be implemented by hardware by executing corresponding software.

According to a fourth aspect, this application further provides a computer-readable storage medium. The computer-readable storage medium stores instructions, and when the instructions are run on an electronic device, the electronic device is enabled to perform the method according to any one of the first aspect and the possible designs of the first aspect.

According to a fifth aspect, an embodiment of this application provides a computer program product. When the computer program product runs on an electronic device, the electronic device is enabled to perform the method according to any one of the first aspect and the possible designs of the first aspect in embodiments of this application.

For each of the second aspect to the fifth aspect and technical effects that may be achieved by the aspect, refer to the descriptions of technical effect that may be achieved by each possible solution in the first aspect. Details are not described herein again.

DESCRIPTION OF EMBODIMENTS

The following describes technical solutions in embodiments of this application with reference to the accompanying drawings in embodiments of this application.

Generally, to facilitate searching for an application, a user may classify applications, and then place applications of a same type in one folder. In embodiments of this application, the folder may include a large folder and a small folder, and the large folder and the small folder can be switched to each other. When the folder is a small folder, the user may touch and hold the small folder, and then switch the small folder to a large folder for display. When the folder is a large folder, the user may also touch and hold the large folder, and then switch the large folder to a small folder for display. It should be understood that, for an application in the small folder, the small folder first needs to be expanded, and then an application icon is tapped to open the application. For an application in the large folder, an application icon can be directly tapped to open the application.

Figure 1A:
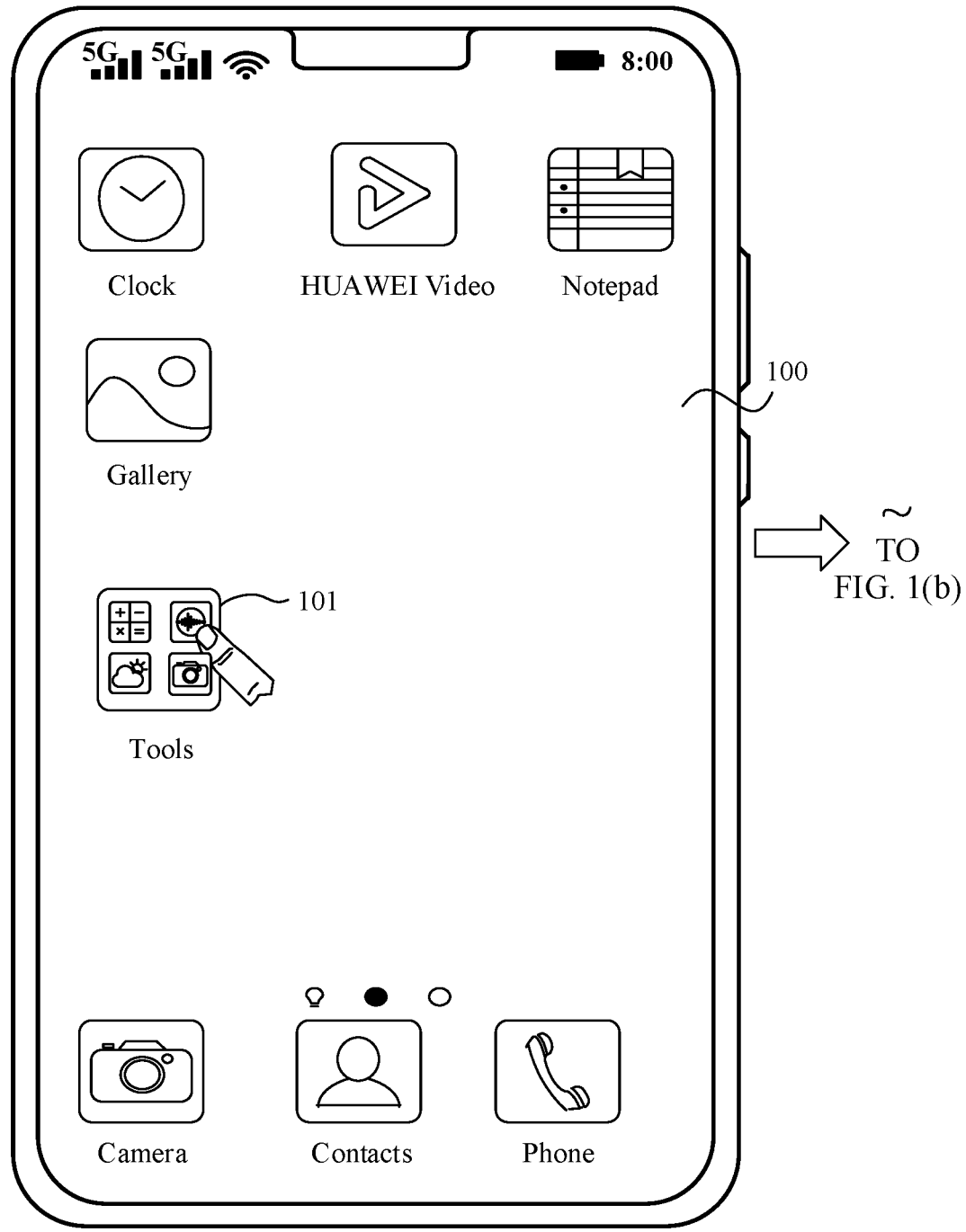
FIG. 1(a) to FIG. 1(c) are a schematic diagram of a user interface.
Figure 1B:
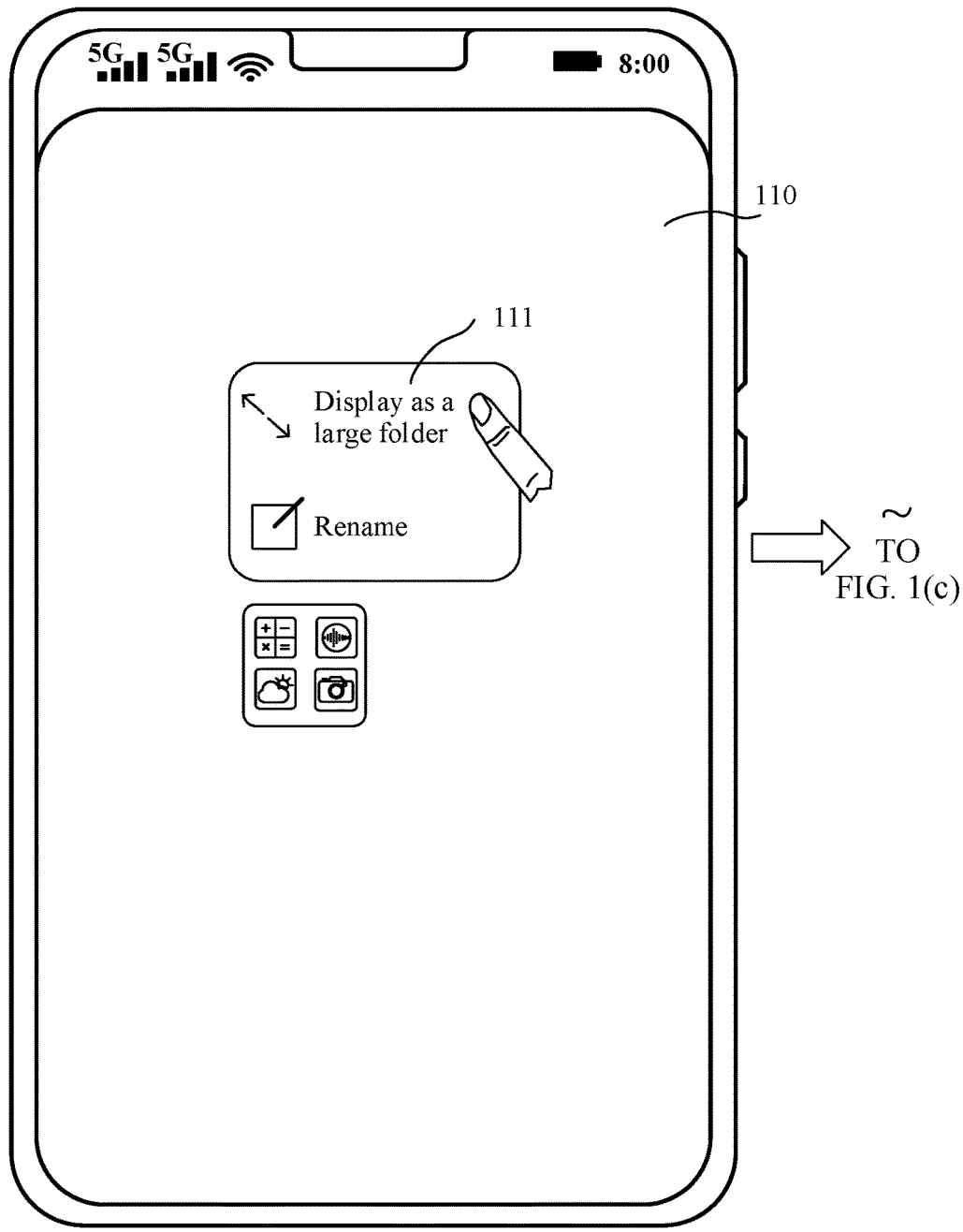
Figure 1C:
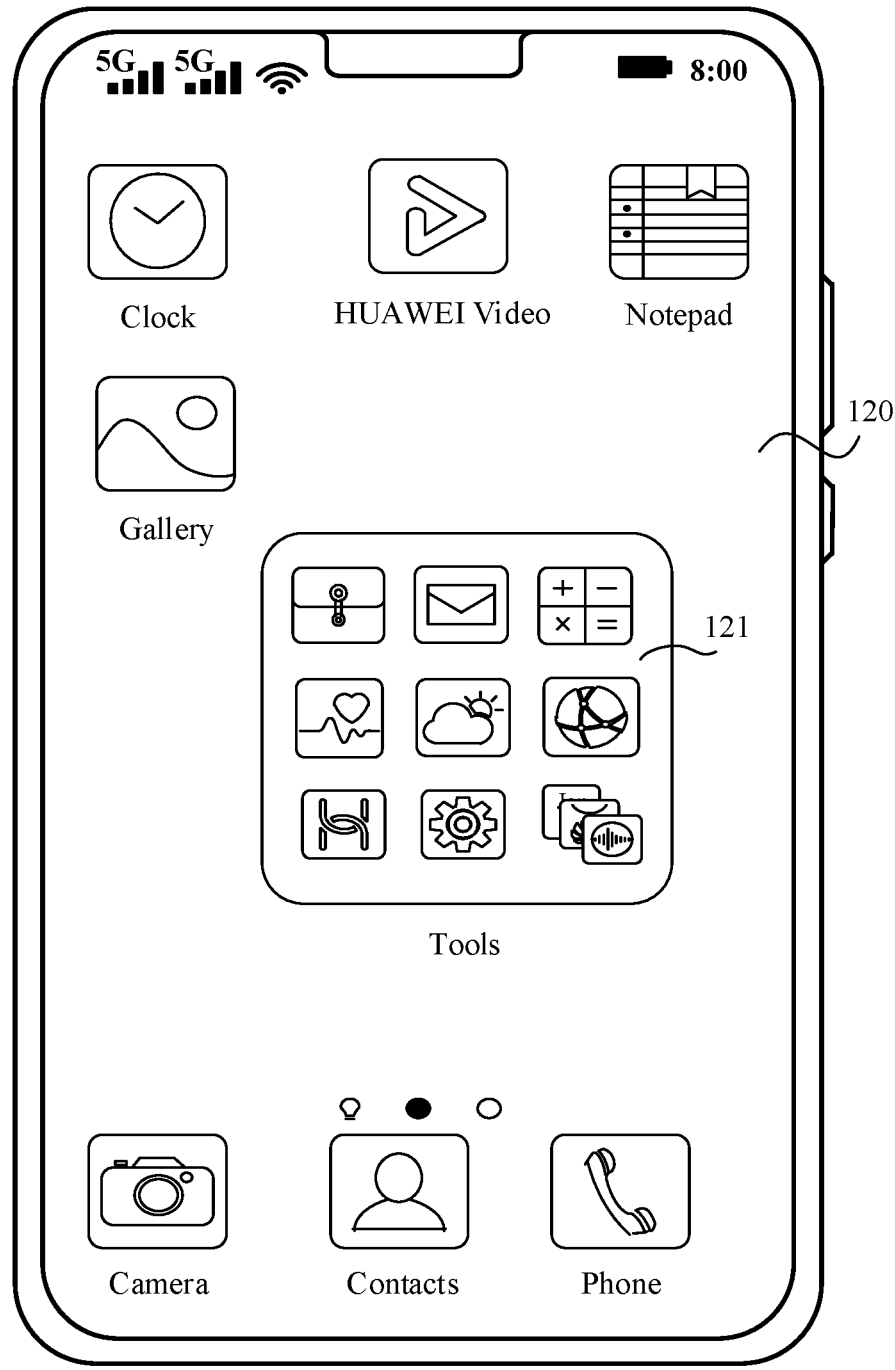

With reference to user interfaces (user interfaces, UI), the following describes switching between a large folder and a small folder and a technical problem existing in the large folder. Refer to FIG. 1(a) to FIG. 1(c). It is assumed that a mobile phone displays a home screen, for example, an interface 100 shown in FIG. 1(a). The interface 100 may include a small folder 101, and a user may tap the small folder 101 to expand the folder. When the user touches and holds the small folder 101, an interface 110 shown in FIG. 1(b) may be displayed. The interface 110 may include a display manner switching button, namely, "display as a large folder" 111. After the user taps the button "display as a large folder" 111, the small folder 101 may be displayed as a large folder. For example, an interface 120 shown in FIG. 1(c) is displayed, and the interface 120 may include a large folder 121.

Currently, when a quantity of app icons included in a large folder is greater than 8, only application icons of first eight apps are normally displayed, and the user can directly tap the icons of the first eight apps to enter the apps. However, a ninth app icon and more app icons may be, for example, displayed as those on an interface shown in FIG. 1(c). To be specific, a plurality of app icons are stacked together. In this case, to open a ninth app and an app after the ninth app, the user needs to tap a position of the ninth icon, then expand the large folder, and tap app icons in an expanded large folder to enter the ninth app and the app after the ninth app. In other words, when the quantity of apps is greater than 8, to open the ninth app and the app after the ninth app is complex, and experience is poor.

In view of this, embodiments of this application provide a display method. In the method, a touch target is set in a specified area of a large folder. When a quantity of applications included in the large folder is greater than a specified quantity, a user can implement page switching of the large folder when sliding on the touch target, so that the user can conveniently search for an application on a page after a first page of the large folder. This improves an application search rate and improves user experience.

It should be understood that the application (app for short) in embodiments of this application is a software program that can implement one or more specific functions. Usually, a plurality of applications may be installed in an electronic device, for example, a camera application, a messaging application, a mailbox application, a video application, and a music application. The application in the following embodiments may be an application installed before delivery of the electronic device, or may be an application downloaded from a network or obtained from another electronic device by the user in a process of using the electronic device.

It should be noted that the display method provided in embodiments of this application is applicable to any electronic device having a display, for example, a mobile phone, a tablet computer, a wearable device (for example, a watch, a band, a smart helmet, or smart glasses), a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). This is not limited in embodiments of this application. The electronic device in embodiments of this application may be a foldable electronic device, for example, a foldable mobile phone or a foldable tablet computer. This is not limited in this application. In addition, an example embodiment of the electronic device includes but is not limited to an electronic device with iOS®, Android®, Microsoft®, HarmonyOS®, or another operating system.

The following uses a mobile phone as an example to describe a structure of the electronic device.

Figure 2:
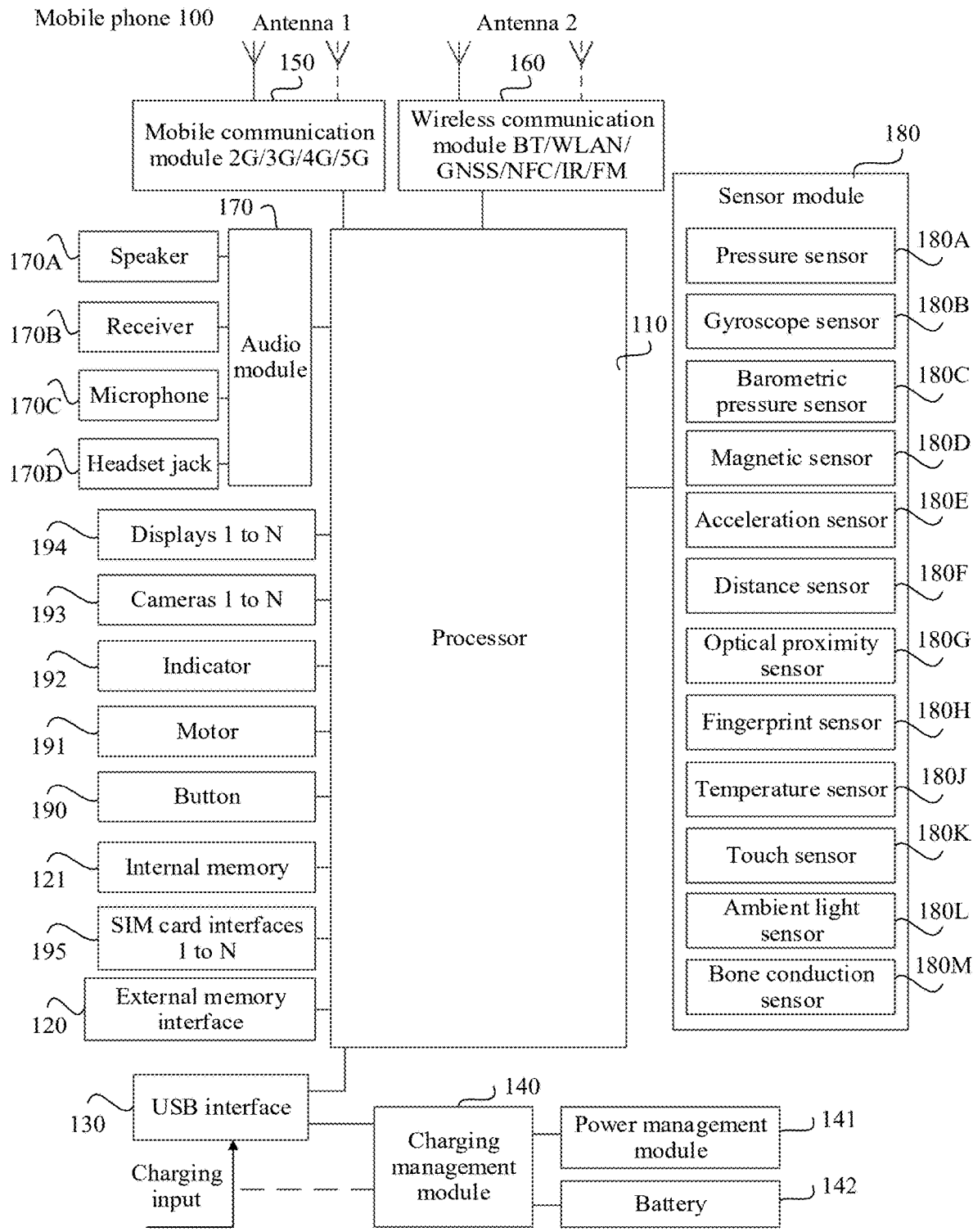
FIG. 2 is a schematic diagram of a structure of an electronic device according to an embodiment of this application.

As shown in FIG. 2, the mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the mobile phone 100. The controller may generate an operation control signal based on an instruction operation code and a time sequence signal, to complete control of instruction reading and instruction execution. A memory may further be disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

The USB interface 130 is an interface that conforms to a USB standard specification, and may be specifically a mini USB interface, a micro USB interface, a USB type-C interface, or the like. The USB interface 130 may be configured to connect to a charger to charge the mobile phone 100, or may be configured to perform data transmission between the mobile phone 100 and a peripheral device. The charging management module 140 is configured to receive a charging input from the charger. The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like.

A wireless communication function of the mobile phone 100 may be implemented through the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna of the mobile phone 100 may be configured to cover a single communication frequency band or a plurality of communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution to wireless communication including 2G/3G/4G/5G applied to the mobile phone 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some functional modules of the mobile communication module 150 may be disposed in a same device as at least some modules of the processor 110.

The wireless communication module 160 may provide a wireless communication solution that is applied to the mobile phone 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the mobile phone 100, the antenna 1 and the mobile communication module 150 are coupled, and the antenna 2 and the wireless communication module 160 are coupled, so that the mobile phone 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division code division multiple access (time-division code division multiple access, TD-SCDMA), long term evolution (long term evolution, LTE), a fifth generation (fifth generation, 5G) mobile communication system, a future communication system such as a sixth generation (sixth generation, 6G) system, the BT, the GNSS, the WLAN, the NFC, the FM and/or IR technology, or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The display 194 is configured to display a display interface of an application and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile phone 100 may include one or N displays 194, where N is a positive integer greater than 1. In this embodiment of this application, the display 194 may be configured to display a home screen or an application interface. The home screen may include a large folder, an application icon, a card, and the like.

The camera 193 is configured to capture a static image or a video. The camera 193 may include a front-facing camera and a rear-facing camera.

The internal memory 121 may be configured to store computer-executable program code. The executable program code includes instructions. The processor 110 implements various function applications and data processing of the mobile phone 100 by running the instructions stored in the internal memory 121. The internal memory 121 may include a program storage area and a data storage area. The program storage area may store an operating system, software code of at least one application (such as an iQIYI application or a WeChat application), and the like. The data storage area may store data (for example, an image and a video) and the like generated in a process of using the mobile phone 100. In addition, the internal memory 121 may include a high-speed random access memory, and may further include a non-volatile memory, for example, at least one magnetic disk storage device, a flash memory device, or a universal flash storage (universal flash storage, UFS).

The external memory interface 120 may be used to connect to an external storage card, for example, a micro SD card, to extend a storage capability of the mobile phone 100. The external storage card communicates with the processor 110 through the external memory interface 120, to implement a data storage function. For example, files such as an image and a video are stored in the external memory card.

The mobile phone 100 may implement an audio function, for example, music playing and recording, through the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed on the display 194. The gyroscope sensor 180B may be configured to determine a motion posture of the mobile phone 100. In some embodiments, the gyroscope sensor 180B may be configured to determine angular velocities of the mobile phone 100 around three axes (namely, x, y, and z axes).

The gyroscope sensor 180B may be configured to determine a motion posture of the mobile phone 100. In some embodiments, the gyroscope sensor 180B may be configured to determine angular velocities of the mobile phone 100 around three axes (namely, x, y, and z axes). The gyroscope sensor 180B may be configured to implement image stabilization during photographing. For example, when a shutter is pressed, the gyroscope sensor 180B detects an angle at which the mobile phone 100 jitters, obtains, through calculation based on the angle, a distance for which a lens module needs to compensate, and allows a lens to cancel the jitter of the mobile phone 100 through reverse motion, to implement image stabilization. The gyroscope sensor 180B may also be used in a navigation scenario and a somatic game scenario.

The barometric pressure sensor 180C is configured to measure barometric pressure. In some embodiments, the mobile phone 100 calculates an altitude based on a value of the atmospheric pressure measured by the barometric pressure sensor 180C, to assist positioning and navigation. The magnetic sensor 180D includes a Hall effect sensor. The mobile phone 100 may detect opening and closing of a flip cover by using the magnetic sensor 180D. In some embodiments, when the mobile phone 100 is a flip phone, the mobile phone 100 may detect opening and closing of a flip cover by using the magnetic sensor 180D. Further, a feature such as automatic unlocking upon opening of the flip cover is set based on a detected opening or closing state of the flip cover. The acceleration sensor 180E may detect magnitude of accelerations in various directions (usually on three axes) of the mobile phone 100. When the mobile phone 100 is still, a value and a direction of gravity may be detected. The acceleration sensor may be further configured to identify a posture of the electronic device, and is used in an application such as switching between a landscape mode and a portrait mode or a pedometer.

The distance sensor 180F is configured to measure a distance. The mobile phone 100 may measure a distance through infrared or laser. In some embodiments, in a photographing scenario, the mobile phone 100 may measure a distance by using the distance sensor 180F, to implement quick focusing. The optical proximity sensor 180G may include, for example, a light-emitting diode (LED) and an optical detector, for example, a photodiode. The light-emitting diode may be an infrared light-emitting diode. The mobile phone 100 emits infrared light by using the light-emitting diode. The mobile phone 100 detects infrared reflected light from a nearby object by using the photodiode. When sufficient reflected light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear for a call, to automatically turn off the screen to save power. The optical proximity sensor 180G may also be used in a smart cover mode or a pocket mode to automatically perform screen unlocking or locking.

The ambient light sensor 180L is configured to sense ambient light brightness. The mobile phone 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G, to detect whether the mobile phone 100 is in a pocket, to avoid an accidental touch. The fingerprint sensor 180H is configured to collect a fingerprint. The mobile phone 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of a processor near the temperature sensor 180J, to reduce power consumption and implement heat protection. In some other embodiments, when the temperature is lower than another threshold, the mobile phone 100 heats the battery 142 to prevent the mobile phone 100 from being shut down abnormally because of a low temperature. In some other embodiments, when the temperature is lower than still another threshold, the mobile phone 100 boosts an output voltage of the battery 142, to avoid an abnormal shutdown caused by a low temperature.

The touch sensor 180K is also referred to as a "touch panel". The touch sensor 180K may be disposed on the display 194. The touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the mobile phone 100 at a position different from a position of the display 194. In this embodiment of this application, the touch sensor 180K may detect a touch operation of the user on the display, for example, may detect a slide operation of the user in a specified area of the large folder. Then, the mobile phone 100 may turn a page of the large folder in response to the slide operation of the user in the specified area of the large folder. Alternatively, the touch sensor 180K may detect a touch operation of the user on the display, for example, may detect a slide operation of the user in another area (a specified area in a non-large folder). Then, the mobile phone 100 may turn a page of the home screen, that is, turn a page of the desktop, in response to the slide operation of the user.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal.

The button 190 includes a power button, a volume button, and the like. The button 190 may be a mechanical button or a touch button. The mobile phone 100 may receive a button input, and generate a button signal input related to a user setting and function control of the mobile phone 100. The motor 191 may generate a vibration prompt. The motor 191 may be configured to provide an incoming call vibration prompt and a touch vibration feedback. For example, touch operations performed on different applications (for example, photo taking and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with and separation from the mobile phone 100.

It may be understood that the components shown in FIG. 2 do not constitute a specific limitation on the mobile phone. The mobile phone may include more or fewer components than those shown in the figure, some components may be combined, some components may be split, or different component arrangements may be used. In the following embodiments, the mobile phone 100 shown in FIG. 2 is used as an example for description.

A software system of the mobile phone 100 may use a layered architecture, including an event-driven architecture, a microkernel architecture, a microservice architecture, or a cloud architecture. In an embodiment of this application, an Android system of the hierarchical architecture is used as an example to describe a software structure of the mobile phone 100. It should be understood that the system in this embodiment of this application may alternatively be a HarmonyOS system. This is not limited in this application.

Figure 3:
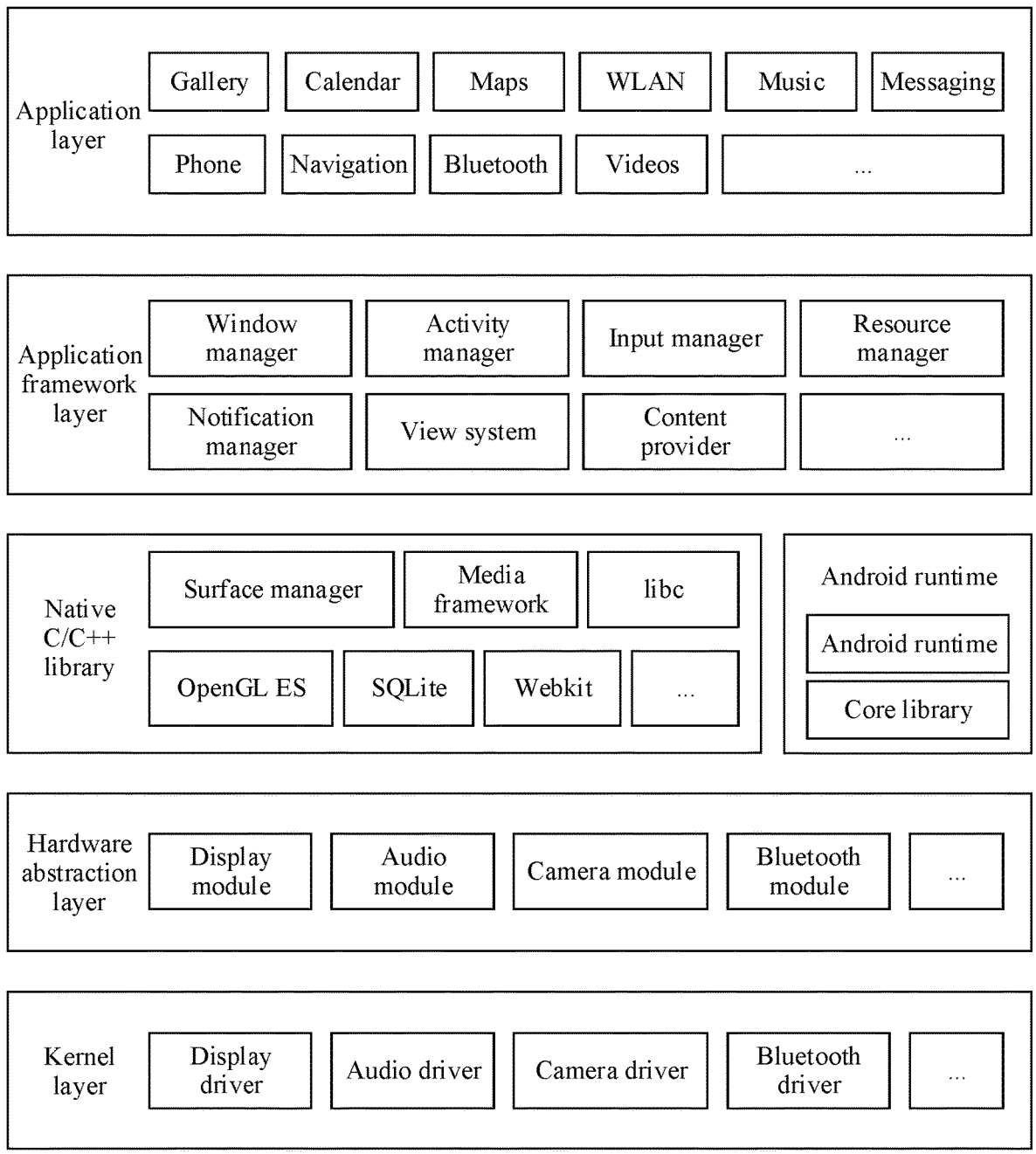
FIG. 3 is a schematic diagram of a software architecture according to an embodiment of this application.

The following describes the software structure of the electronic device with reference to different scenarios. FIG. 3 is a block diagram of the software structure of the mobile phone 100 according to an embodiment of this application. In the layered architecture, software is divided into several layers, and each layer has a clear role and task. The layers communicate with each other through a software interface. In some embodiments, the Android system is divided into five layers: an application layer, an application framework layer, an Android runtime (Android runtime, ART) and native C/C++ library, a hardware abstract layer (hardware abstract layer, HAL), and a kernel layer from top to bottom.

The application layer may include a series of application packages. As shown in FIG. 3, the application packages may include applications such as Gallery, Calendar, Phone, Maps, Navigation, WLAN, Bluetooth, Music, Videos, and Messaging The application framework layer provides an application programming interface (application programming interface, API) and a programming framework for an application at the application layer. The application framework layer includes some predefined functions.

As shown in FIG. 3, the application framework layer may include a window manager, a content provider, a view system, a resource manager, a notification manager, an activity manager, an input manager, and the like.

The window manager provides a window manager service (window manager service, WMS), and the WMS may be used for window management, window animation management, surface management, and as a transit station of an input system.

The content provider is configured to store and obtain data, and enable the data to be accessed by an application. The data may include a video, an image, audio, calls that are made and received, a browsing history and bookmarks, an address book, and the like.

The view system includes visual controls such as a control for displaying a text and a control for displaying an image. The view system may be used to construct an application. A display interface may include one or more views. For example, a display interface including an SMS message notification icon may include a text display view and an image display view.

The resource manager provides various resources such as a localized string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The activity manager may provide an activity manager service (Activity Manager Service, AMS), and the AMS may be used to start, switch, and schedule system components (such as activities, services, content providers, and broadcast receivers), and manage and schedule application processes.

The input manager may provide an input manager service (Input Manager Service, IMS), and the IMS may be used to manage a system input, for example, a touchscreen input, a key input, and a sensor input. The IMS obtains an event from an input device node and allocates the event to an appropriate window through interaction with the WMS.

The Android runtime includes a core library and Android runtime. The Android runtime is responsible for converting source code into machine code. The Android runtime mainly includes an ahead of time (ahead of time, AOT) compilation technology and a just in time (just in time, JIT) compilation technology.

The core library is mainly configured to provide basic Java-class libraries, such as a basic data structure, mathematics, I/O, a tool, a database, and a network. The core library provides the API for the user to develop the Android application.

The native C/C++ library may include a plurality of functional modules, such as a surface manager (surface manager), a media framework (Media Framework), libc, OpenGL ES, SQLite, and Webkit.

The surface manager is configured to manage a display subsystem, and provide fusion of 2D and 3D layers for a plurality of applications. The media framework supports playing and recording of a plurality of commonly used audio and video formats, static image files, and the like. The media library may support a plurality of audio and video encoding formats, for example, MPEG-4, H.264, MP3, AAC, AMR, JPG, and PNG. The OpenGL ES draws and operates 2D and 3D graphics in an application. The SQLite provides a lightweight relational database for an application of the electronic device 100.

The hardware abstract layer runs in user space (user space), encapsulates a kernel layer driver, and provides a calling interface for an upper layer.

The kernel layer is a layer between hardware and software. The kernel layer includes at least a display driver, a camera driver, an audio driver, and a sensor driver.

The following describes, based on FIG. 2 and FIG. 3, an example of a working process of software and hardware of the electronic device 100. When the touch sensor 180K receives a touch operation, a corresponding hardware interrupt is sent to the kernel layer. The kernel layer processes the touch operation into an original input event (including coordinates of the touch operation). The original input event is stored at the kernel layer. The application framework layer obtains the original input event from the kernel layer, and identifies a control corresponding to the input event. For example, the touch operation is a slide operation. When the touch sensor 180K receives the slide operation, a corresponding hardware interrupt is sent to the kernel layer. The kernel layer may process the slide operation into an original input event and store the event. The event may include start position coordinates of the slide operation and end position coordinates of the slide operation. The application framework layer obtains the original input event from the kernel layer, and identifies the input event. For example, the application framework layer may identify that the event is a slide operation on the large folder. In this case, in response to the slide operation, the electronic device turns a page of the large folder, that is, displays an interface after page turning of the large folder.

The following embodiments are described by using an example in which the embodiments are applied to the architecture of the mobile phone 100 shown in FIG. 2.

In addition, in the following embodiments, "at least one" means one or more, and "a plurality of" means two or more. In addition, it should be understood that in the descriptions of this application, terms such as "first" and "second" are merely used for differentiation and description.

Figure 4:
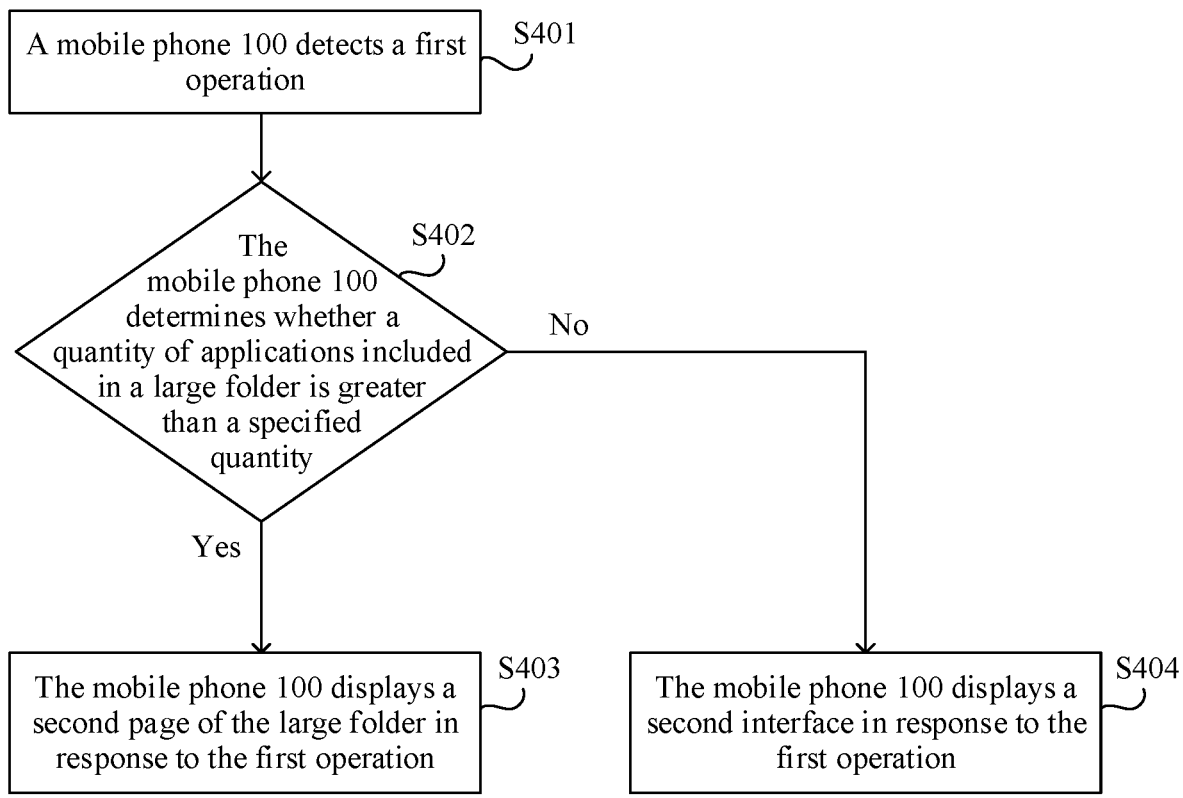
FIG. 4 is a flowchart of a display method according to an embodiment of this application.

FIG. 4 is a flowchart of a display method according to an embodiment of this application. As shown in FIG. 4, the method may include the following steps.

S401: A mobile phone 100 detects a first operation.

The first operation may be a slide operation performed by the user on a first page of a large folder included on a first interface of a display. In some embodiments, the slide operation may be a slide operation performed by the user from right to left starting from any position on the large folder, for example, a slide operation starting from a position close to a right edge of the large folder to left, or a slide operation starting from a position that is close to a right edge of the large folder but at a distance from the right edge to left.

In some other embodiments, the slide operation may be a slide operation from left to right/from top to bottom/from bottom to top on the large folder, for example, may be a slide operation starting from a position at a left edge of the large folder to right, or a slide operation starting from a position that is close to a left edge of the large folder but at a distance from the left edge to right. In another embodiment, the slide operation may alternatively be a slide operation from right to left/from left to right/from top to bottom/from bottom to top on the large folder with pressure. For example, the mobile phone 100 responds to a right-to-left slide operation only when the mobile phone 100 detects the slide operation and a pressure sensor disposed on the display detects that a value of pressure generated by the slide operation is greater than a specified threshold.

It should be understood that, a left-to-right slide operation on the first page may be used to slide the first page to a page after the first page. A right-to-left slide operation on the first page may be used to slide the first page to a page before the first page. It may also be understood that the left-to-right slide operation is an operation of sliding to a next page, and the right-to-left slide operation is an operation of sliding back to a previous page.

In another embodiment, the slide operation may alternatively be a slide operation that is from right to left/from left to right/from top to bottom/from bottom to top on the large folder and that stays or holds at a sliding end position for preset duration without an interval. For example, the mobile phone 100 responds to a right-to-left slide operation performed by the user on the large folder only when the mobile phone 100 detects the slide operation and the mobile phone 100 detects that the slide operation slides to an end position (namely, the sliding end position) and stays or holds for the preset duration (for example, 2 seconds) at the end position.

S402: The mobile phone 100 determines whether a quantity of applications included in the large folder is greater than a specified quantity. If the quantity of applications included in the large folder is greater than the specified quantity, S403 continues to be performed; or if the quantity of applications included in the large folder is less than or equal to the specified quantity, S404 is performed.

S403: The mobile phone 100 displays a second page of the large folder in response to the first operation.

For ease of description, a page displayed after the first operation may be denoted as the "second page", and the second page may be a page after the first page or a page before the first page. This is not limited in this application. In addition, application icons on the second page may be completely different, or may be partially the same. For example, the application icons on the second page may include a part of application icons on the first page.

In some embodiments, when detecting the first operation performed by the user on the large folder, the mobile phone 100 may determine whether the quantity of applications included in the large folder is greater than the specified quantity (for example, the specified quantity may be 8). When the quantity of applications is greater than 8, the mobile phone 100 may display the second page of the large folder in response to the first operation performed by the user on the first page. For example, it is assumed that the first operation is a left-to-right slide operation performed by the user on the first page. In this case, the mobile phone 100 may respond to the slide operation of the user, and the second page after the first page may be displayed in the large folder. Certainly, the specified quantity may alternatively be another quantity, for example, 9 or 12. This is not limited in this application.

Figure 5A:
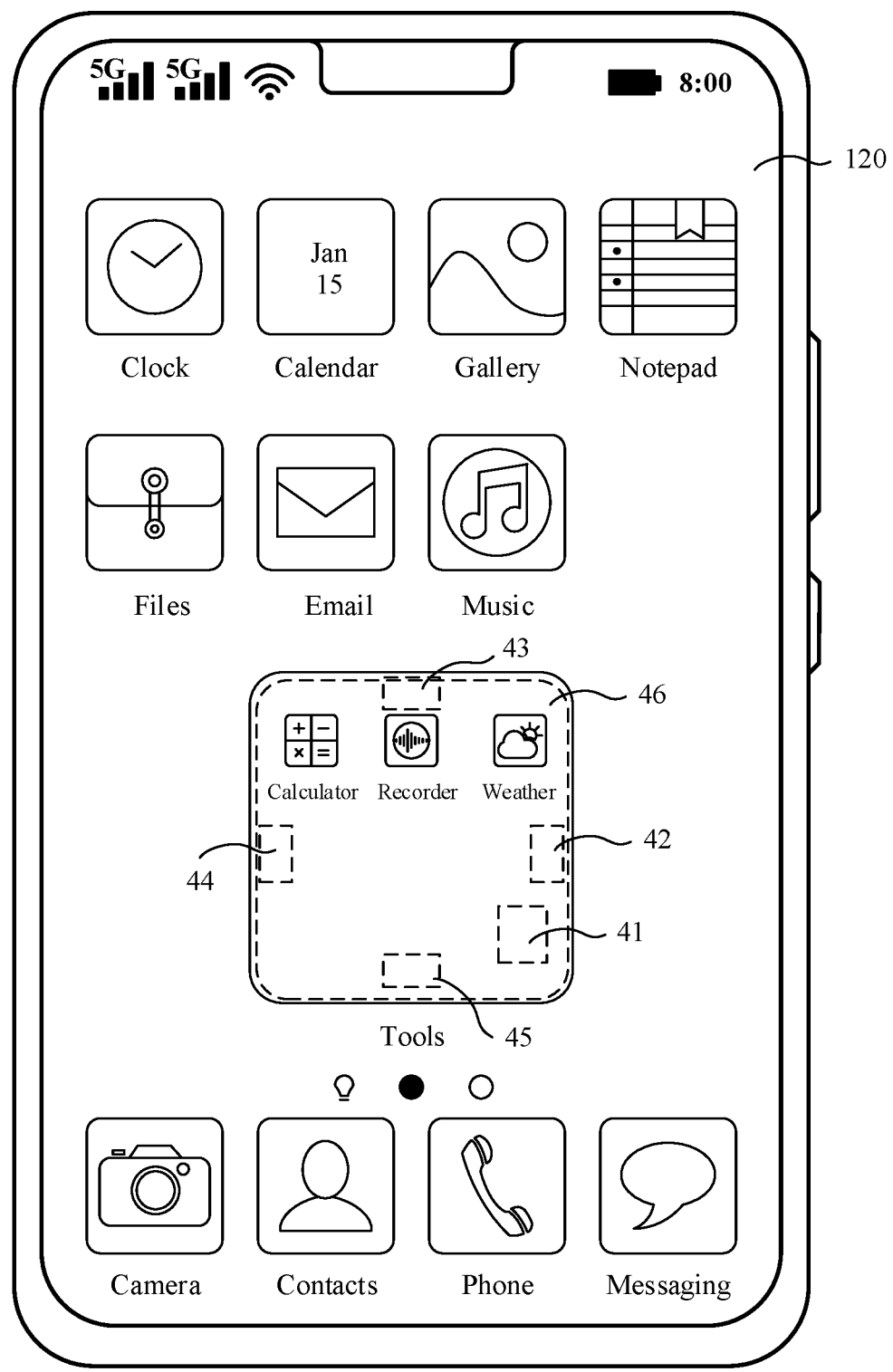
FIG. 5A is a schematic diagram of a position of a touch target according to an embodiment of this application.

In some embodiments, a touch target may be set in a specified area of the large folder. Then, when detecting a slide operation performed by the user in the touch target, the mobile phone 100 may respond to the slide operation based on the quantity of applications included in the large folder, to perform page switching of the large folder or page switching of a home screen. For example, FIG. 5A is a schematic diagram of possible positions of a touch target according to an embodiment of this application. For example, the position of the touch target may be an area 41, an area 42, an area 43, an area 44, an area 45, or an area 46. The area 41 may be a position of a ninth application icon, the area 42, the area 43, the area 44, and the area 45 may be some areas in which four edges of the large folder are located, and the area 46 is the entire large folder. In other words, the touch target may be set in a part of the large folder, or may be set in the entire large folder.

The following describes in detail several page switching processes of the large folder when the touch target is in different positions.

Example 1: The Touch Target is Set at a Position of an $N^{th}$ Application Icon in the Large Folder N is a positive integer, and N≥1. In other words, the touch target may be set at a position of any application icon in the large folder. It should be understood that, if 8 application icons can be normally displayed in the large folder, 1≤N≤9; or if 12 application icons can be normally displayed in the large folder, 1≤N≤12; or the like. This is not limited in this application. It should be noted that, in embodiments of this application, a quantity of application icons included in a folder is not limited, and a quantity of application icons displayed on each page of the folder (or application icons that are able to be directly opened) is not limited.

Figure 5B:
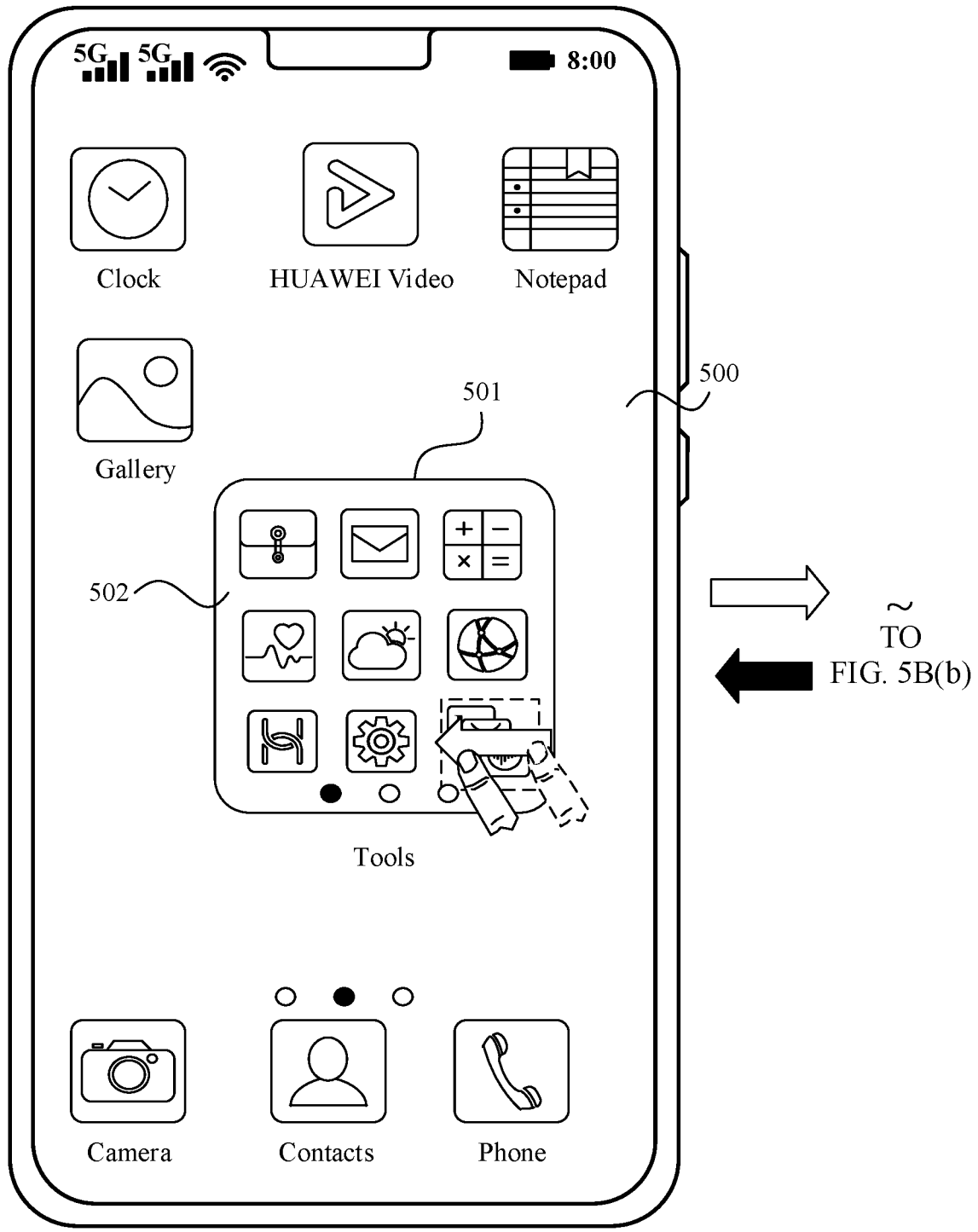
FIG. 5B(a) and FIG. 5B(b) are a schematic diagram of a user interface according to an embodiment of this application.
Figure 5B:
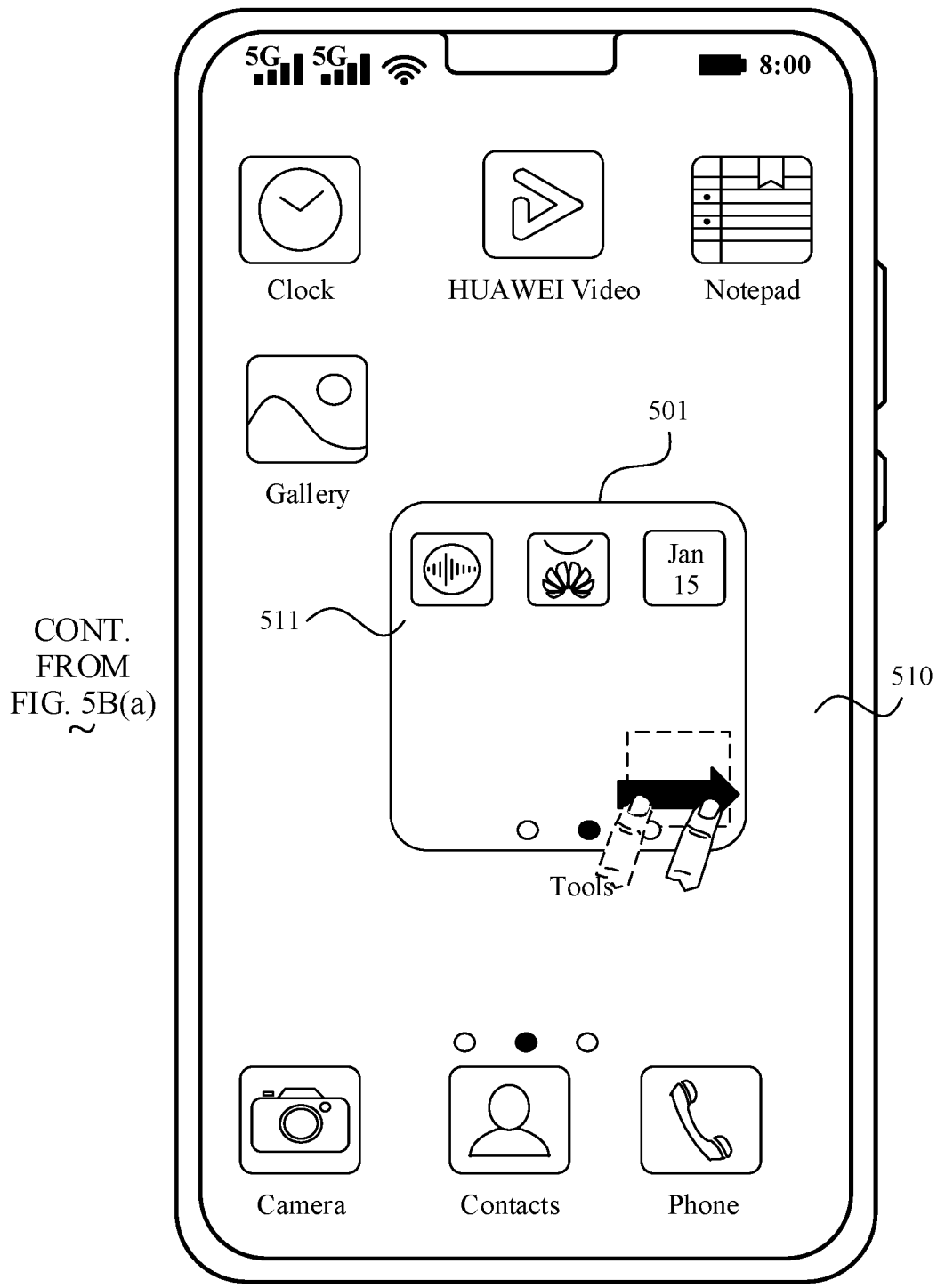

The following provides descriptions by using an example in which the quantity of application icons that are able to be normally displayed in the large folder is 8. When the quantity of applications included in the large folder is greater than 8, and the user triggers the first operation at the position of the ninth application icon, the mobile phone 100 may switch a display page of the large folder in response to the first operation of the user. Refer to FIG. 5B(a) and FIG. 5B(b). It is assumed that the mobile phone 100 displays the home screen, for example, an interface 500 shown in FIG. 5B(a). The interface 500 may include a large folder 501 and a first page 502 of the large folder. For example, the first page 502 may include a Files application icon, an Email application icon, a Calculator application icon, a Health application icon, a Weather application icon, a Browser application icon, an AI Life application icon, a Settings application icon, application icons displayed in an overlapping manner, and the like. It should be understood that, during actual product implementation, the interface may include more or fewer icons than those shown in the figure, for example, may further include application icons that are not in the large folder 501 (for example, as shown in FIG. 5B(a), a Clock application icon, a Huawei Video application icon, a Notepad application icon, a Gallery application icon, and a Camera application icon, a Contacts application icon, and a Phone application icon in a dock area in a shortcut window area) The application icons displayed in the overlapping manner are application icons of a ninth application and applications after the ninth application. An area in which the dashed-line box shown in the figure is located represents a range of the touch target. During actual product implementation, the dashed-line box is not displayed on the interface.

It should be understood that, during actual product implementation, if the large folder includes a large quantity of applications, application icons at the position of the ninth application icon may be displayed by using a stacking effect shown in the figure, or may be displayed by using another display effect. For example, the application icons at the position of the ninth application icon may alternatively be normally displayed (in other words, an application may be directly opened by tapping an application icon). This is not limited in this application.

It is assumed that the first operation is a slide operation shown in FIG. 5B(a). To be specific, when a finger of the user slides from right to left at the position of the ninth application icon of the large folder, the mobile phone 100 may switch the page of the large folder to a next page in response to the slide operation, for example, may display an interface 510 shown in FIG. 5B(b). The interface 510 may include the large folder 501 and a second page 511 of the large folder. For example, the second page 511 may include a Recorder application icon, an AppGallery application icon, and a Calendar application icon. When the Files application icon is an application icon of a first application in the large folder, the Recorder application icon may be the application icon of the ninth application included in the large folder.

It should be noted that the position of the ninth application icon is a position of a ninth icon on each page of the large folder, and is not a position of an application icon of a ninth application in all applications included in the large folder.

It should be understood that, when the finger of the user slides from right to left at the position of the ninth application icon of the large folder, a current page may be slid to a next page after the current page. For example, the current page is the first page of the large folder, and the next page is the second page of the large folder. Application icon numbers on the first page may be 1 to 8, and application icon numbers on the second page may be 9 to 14. If the second page needs to be slid back to the first page, sliding may be performed from left to right at the position of the ninth application icon of the large folder, and the mobile phone 100 may slide a current page of the large folder to a previous page in response to the left-to-right slide operation. For example, it is assumed that the mobile phone 100 displays the interface shown in FIG. 5B(b). In this case, the user may slide from left to right at the position of the ninth application icon on the second page 511 of the large folder shown in FIG. 5B(b), for example, in a direction of a black arrow shown in FIG. 5B(b). The mobile phone 100 may switch the interface shown in FIG. 5B(b) back to the interface shown in FIG. 5B(a) in response to slide operation. In other words, the second page 511 of the large folder may be switched back to the first page 502. Certainly, when the second page is slid back to the first page, sliding may be performed at a position of another application icon of the large folder. For example, sliding may be performed from left to right at a position of a seventh application icon of the large folder. This is not limited in this application.

Example 2: The Hots Zone is Set in an Edge Area of the Large Folder

Figure 5C:
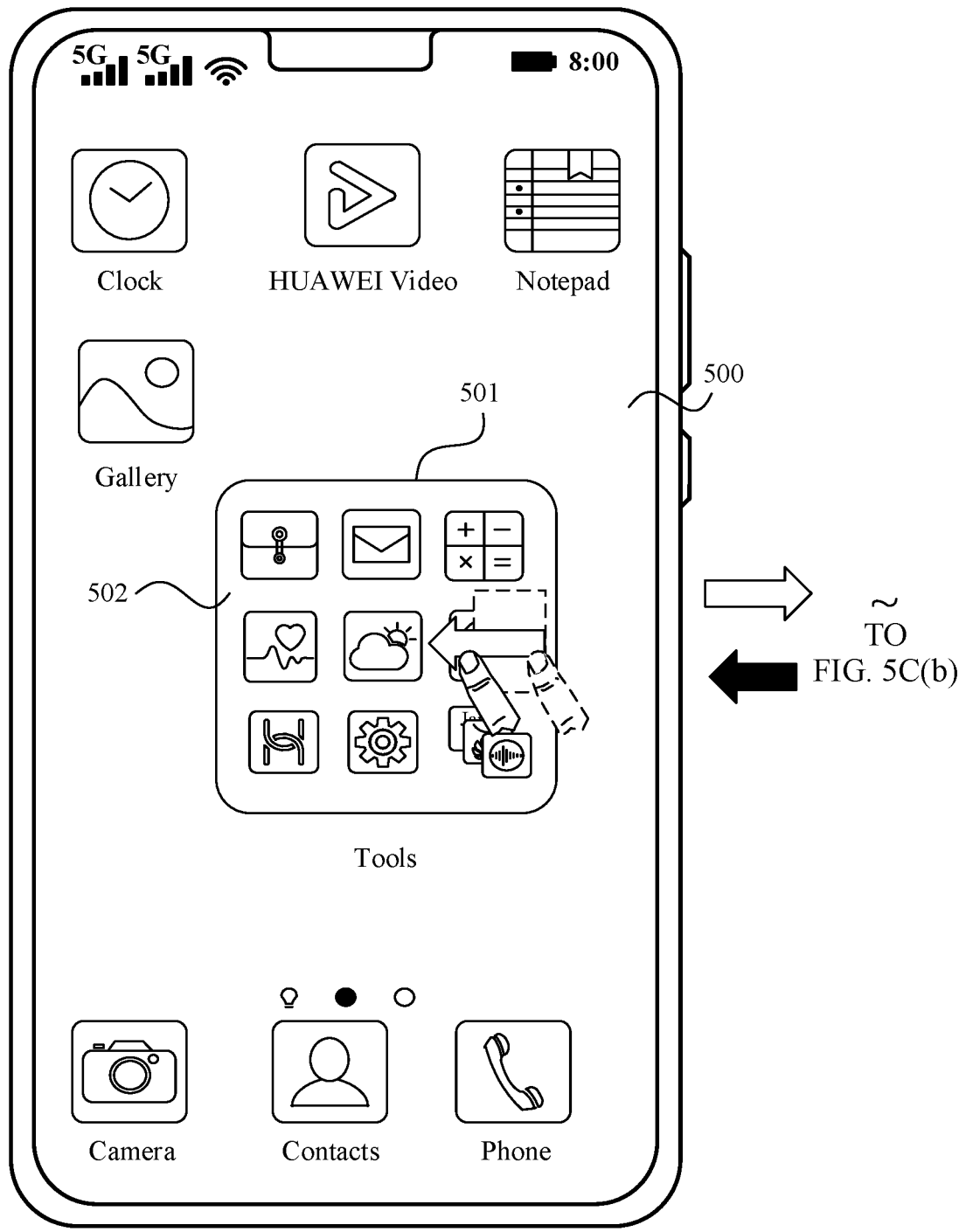
FIG. 5C(a) and FIG. 5C(b) are a schematic diagram of a user interface according to an embodiment of this application.
Figure 5C:
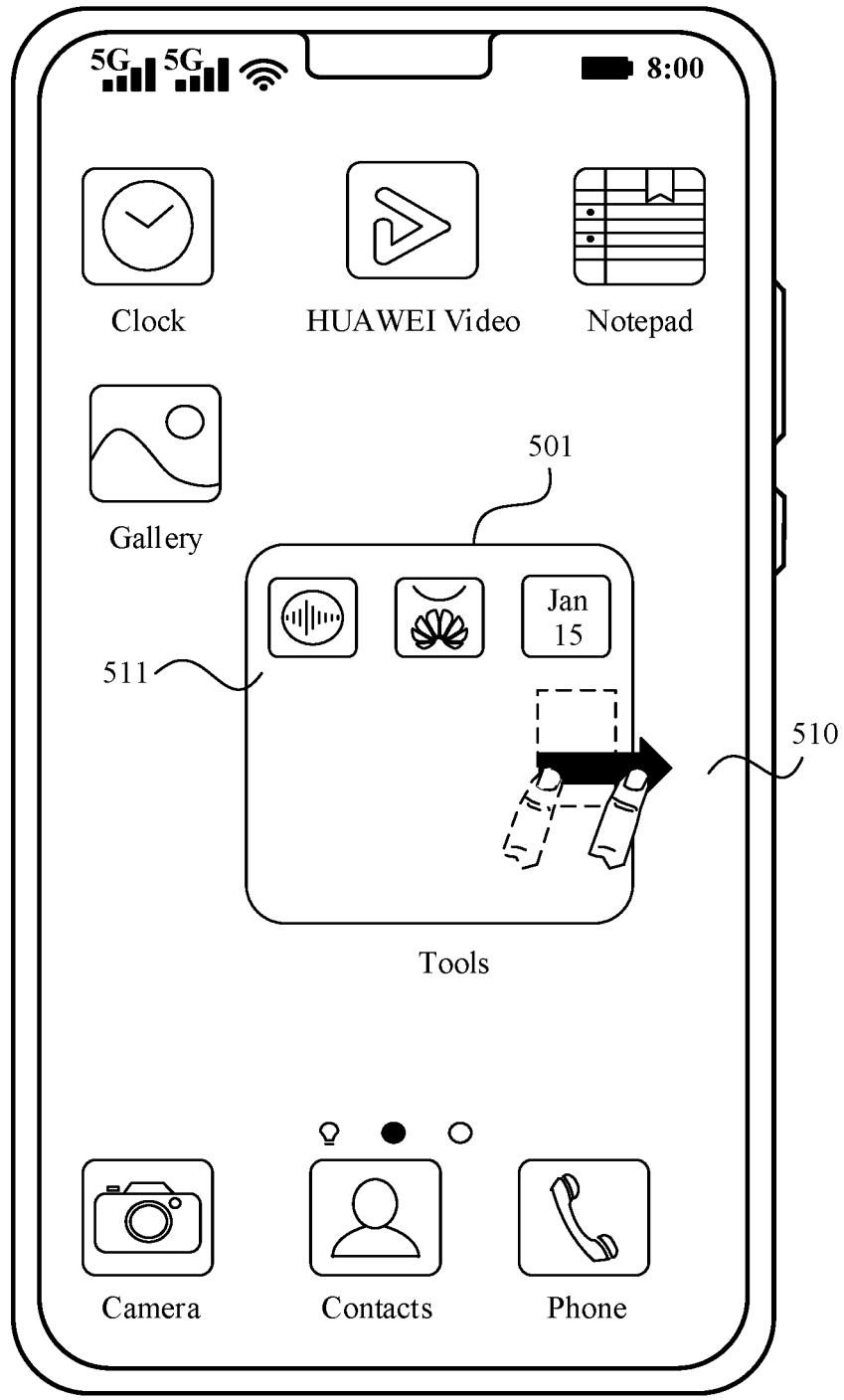

As shown in FIG. 5C(a) and FIG. 5C(b), it is assumed that the touch target is set at a left/right edge of the large folder. For example, a position of the touch target may be a position of a dashed-line box on an interface shown in FIG. 5C(a). It is assumed that the interface shown in FIG. 5C(a) is the home screen of the mobile phone 100. When a finger of the user slides left along the right edge of the large folder at the position of the touch target, for example, performs a slide operation shown in FIG. 5C(a), the mobile phone 100 may detect the slide operation, respond to the slide operation, and then display an interface shown in FIG. 5C(b). It should be understood that a dashed-line box on the interface shown in FIG. 5C(b) is the position of the touch target. Before and after page switching, the position of the touch target may change or may not change. In some embodiments, an edge of the touch target may be flush with an edge of the large folder, or an edge of the touch target may be at a specific distance from an edge of the large folder. This is not limited in this application. It should be understood that, when the touch target is disposed at a position of the left edge of the large folder, for a specific implementation, refer to detailed descriptions in FIG. 5C(a) and FIG. 5C(b). Details are not described herein again.

In some embodiments, after the user slides the interface 500 of the mobile phone 100 to the interface 510, that is, switches the page of the large folder from the page 502 to the page 511, if the user wants to slide the page of the large folder from the page 511 back to the page 502, the user may switch the page back by using a slide operation in a reverse direction. For example, a slide operation may be performed in a direction (a direction from left to right) of a black arrow shown in FIG. 5C(b), and the mobile phone 100 may switch the page 511 of the large folder back to the page 502 in response to the slide operation of the user. It should be noted that, when the page 511 is slid to the page 502, a slide operation may be performed at a position of a touch target at the right edge shown in the figure, or a slide operation may be performed at a position of a touch target at the left edge. This is not limited in this application.

Figure 5D:
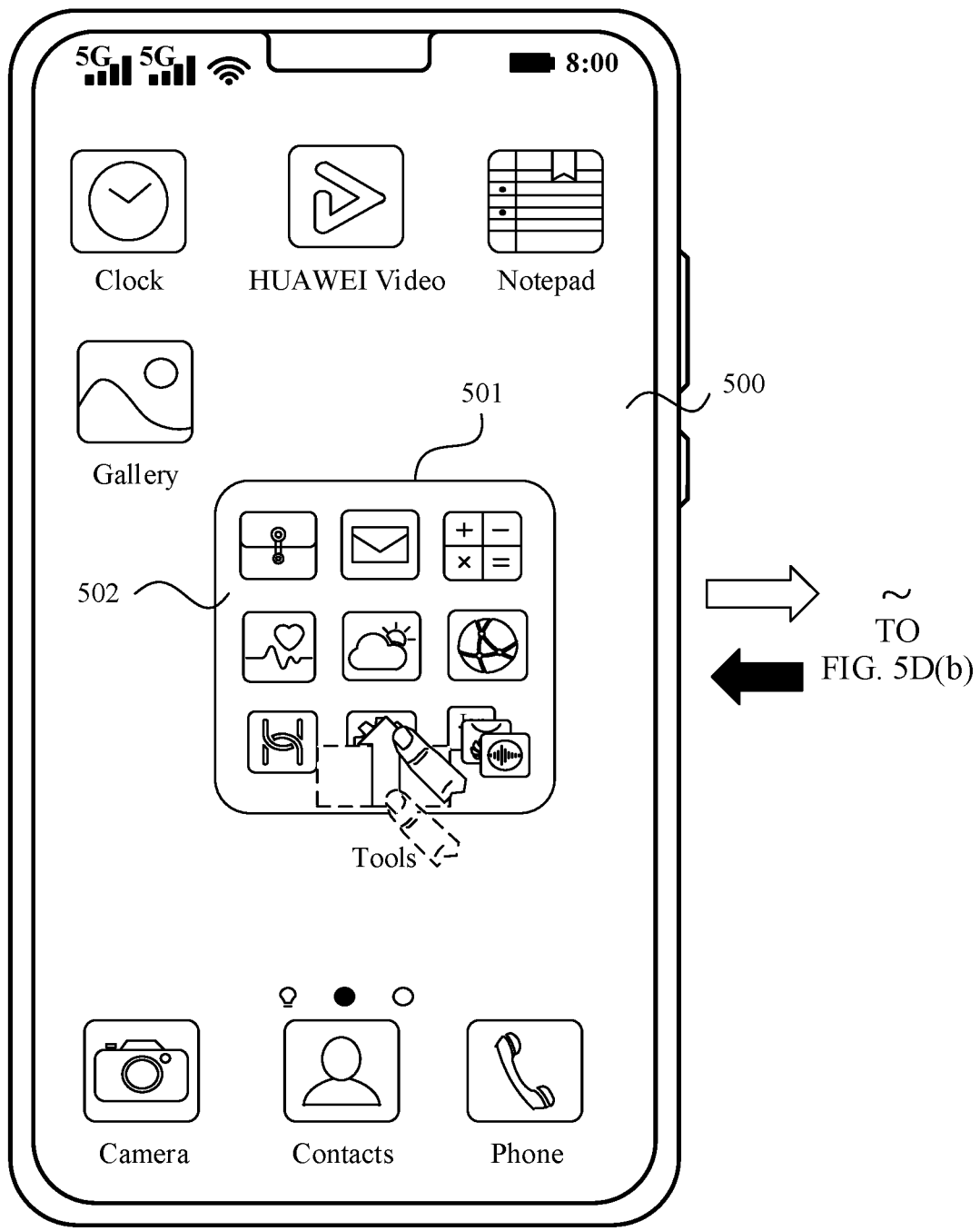
FIG. 5D(a) and FIG. 5D(b) are a schematic diagram of a user interface according to an embodiment of this application.
Figure 5D:
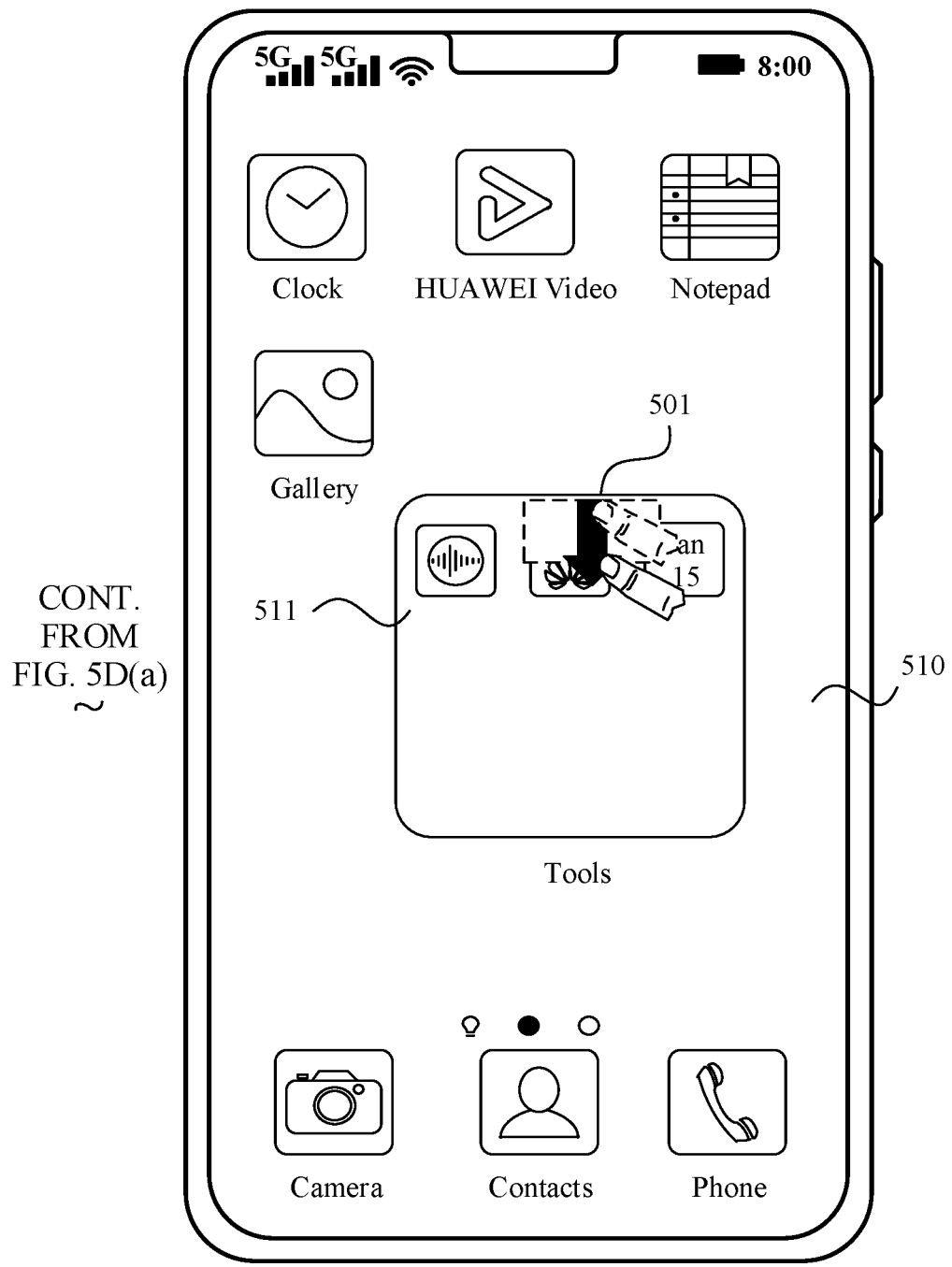

As an alternative implementation, the touch target may set in an upper/lower edge area of the large folder. As shown in FIG. 5D(a) and FIG. 5D(b), it is assumed that the touch target is set at a lower edge of the large folder. For example, a position of the touch target may be a position of a dashed-line box on an interface shown in FIG. 5D(a). It is assumed that the interface shown in FIG. 5D(a) is the home screen of the mobile phone 100. When a finger of the user slides up along the lower edge of the large folder at the position of the touch target, for example, performs a slide operation shown in FIG. 5D(a), the mobile phone 100 may detect the slide operation, respond to the slide operation, and then display an interface shown in FIG. 5D(b). It should be understood that, when the touch target is disposed at a position of the upper edge area of the large folder, for a specific implementation, refer to detailed descriptions in FIG. 5D(a) and FIG. 5D(b). Details are not described herein again.

Similarly, in the schematic diagram shown in FIG. 5D(a) and FIG. 5D(b), when the user slides in a direction of a black arrow (a direction from top to bottom) at a position of a touch target at an upper edge of the schematic diagram shown in FIG. 5D(b), the mobile phone 100 may switch the interface of the mobile phone 100 back to the interface 500 in response to the slide operation, that is, switch the page of the large folder from the page 511 back to the page 502.

It should be noted that, display content of the interface shown in FIG. 5C(a) and the interface shown in FIG. 5D(a) is the same as that of the interface shown in FIG. 5B(a), and display content of the interface shown in FIG. 5C(b) and the interface shown in FIG. 5D(b) is the same as that of the interface shown in FIG. 5B(b), except that setting positions of the touch target are different.

Example 3: The Entire Area of the Large Folder is Set as the Touch Target

Figure 5E:
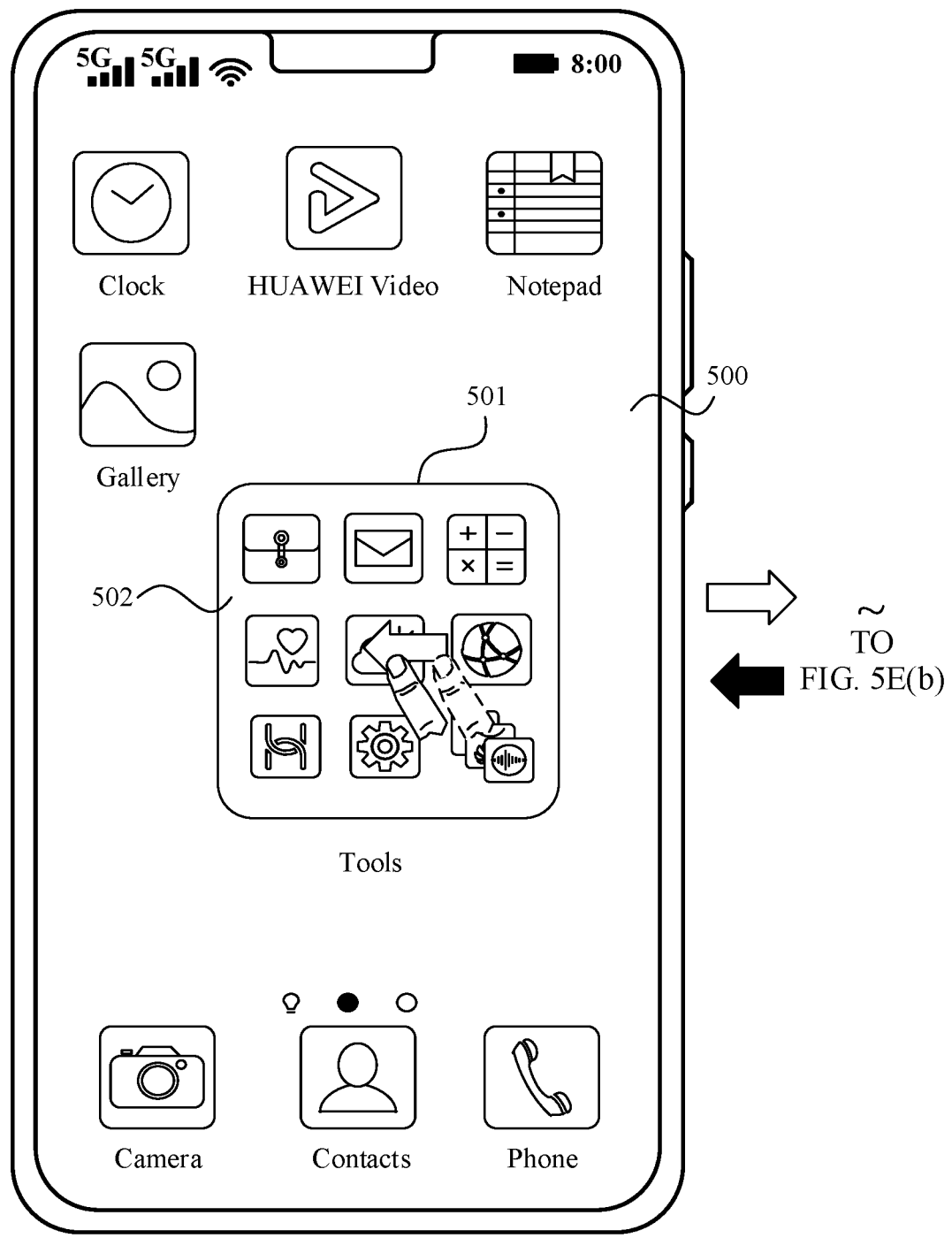
FIG. 5E(a) to FIG. 5E(c) are a schematic diagram of a user interface according to an embodiment of this application.
Figure 5E:
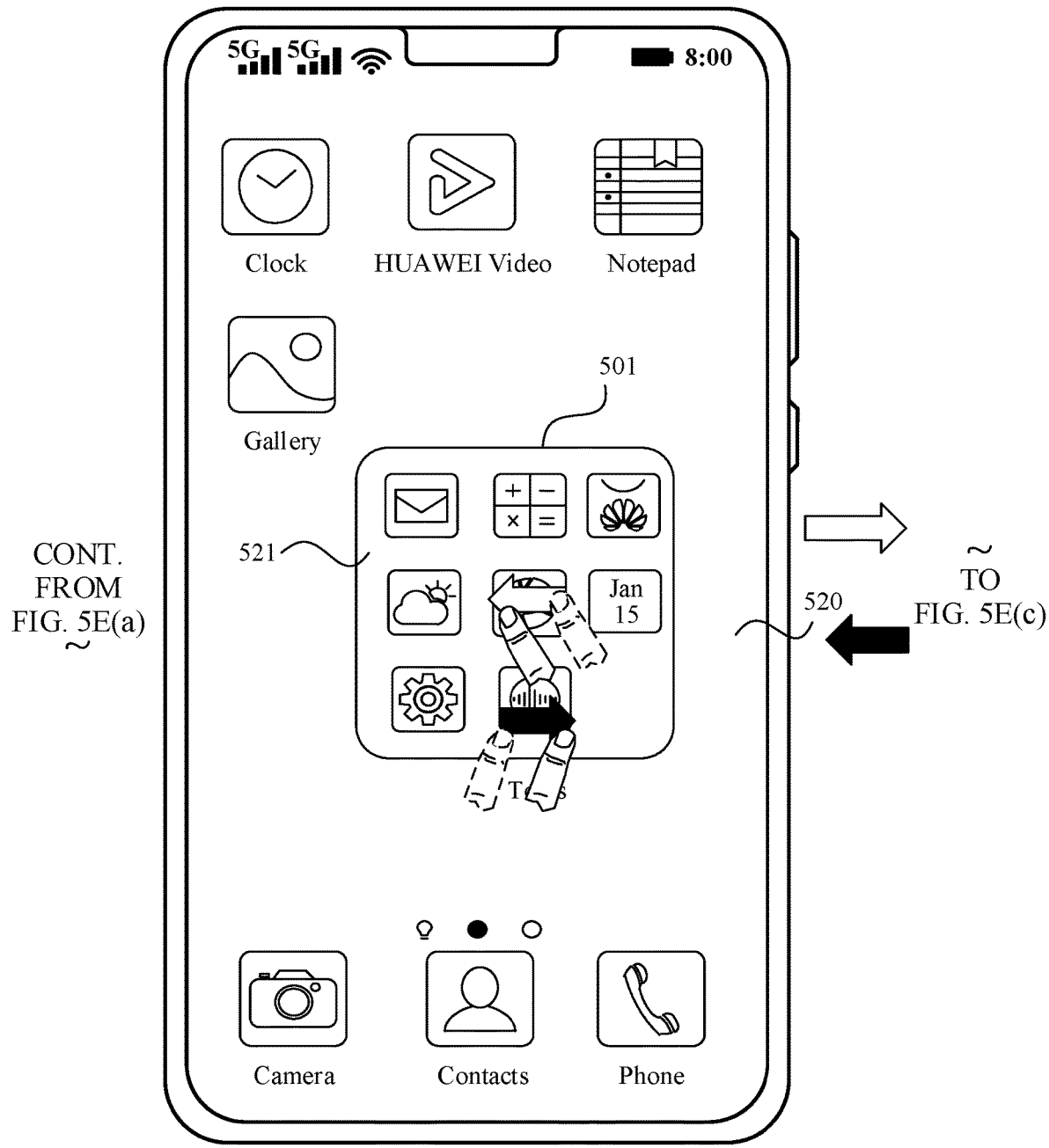
Figure 5E:
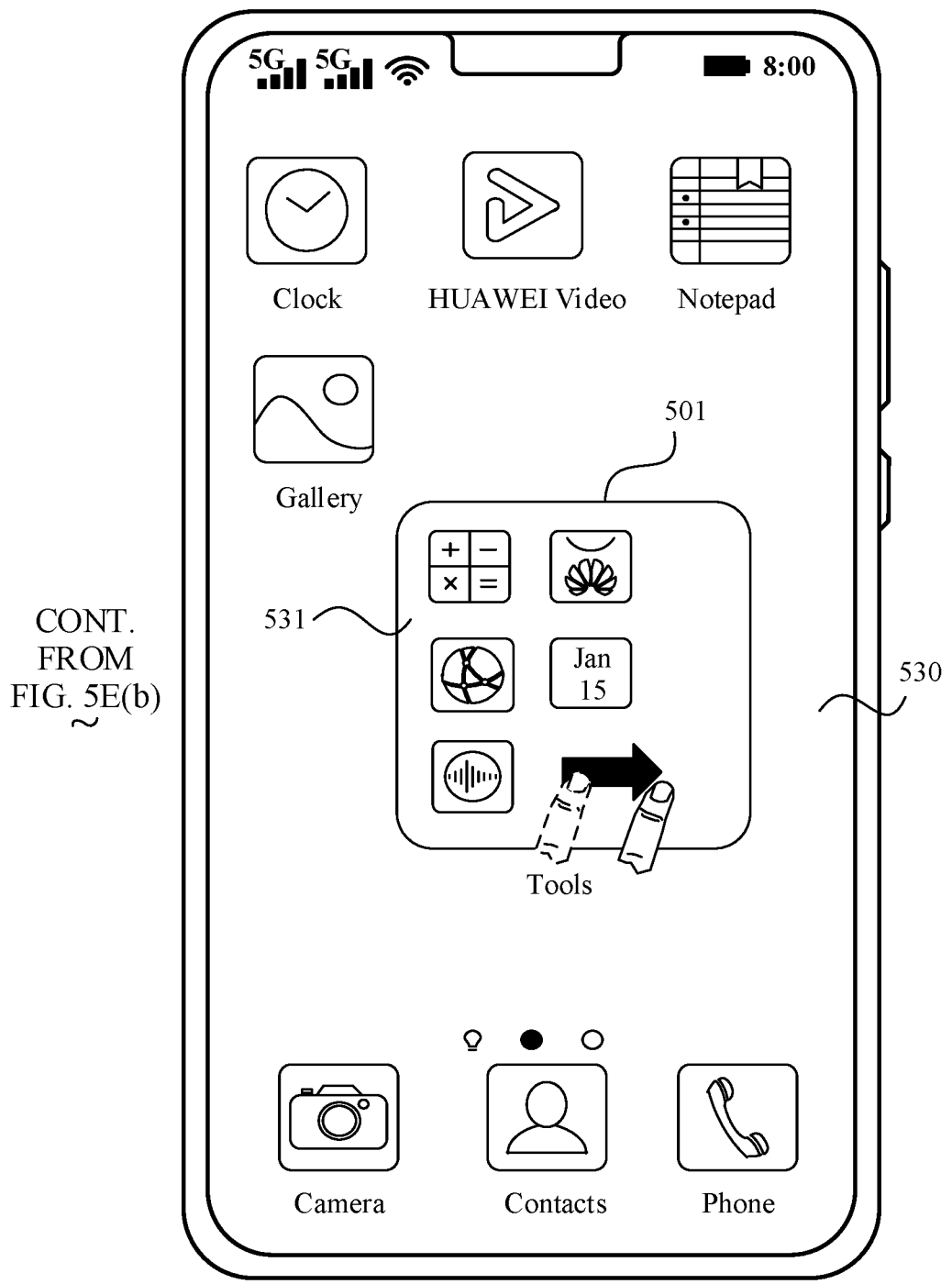

As shown in FIG. 5E(a) to FIG. 5E(c), when the touch target is set in the entire large folder, it is assumed that the mobile phone 100 displays a home screen shown in FIG. 5E(a). When a finger of the user slides on the large folder, the mobile phone 100 may display an application icon of the large folder based on a sliding distance of the finger of the user.

In a possible implementation, the mobile phone 100 may respond to a slide operation performed by the user on the first page, and display, on the second page based on the sliding distance, a part of application icons on the first page. For example, it is assumed that the user slides from right to left on the first page 502 of the large folder 501 on the interface shown in FIG. 5E(a), and the sliding distance is x. The mobile phone 100 may detect the slide operation, respond to the slide operation, and then display an interface 520 shown in FIG. 5E(b). The interface 520 may include a third page 521 of the large folder. For example, the third page 521 may include an Email application icon, a Calculator application icon, a Weather application icon, a Browser application icon, a Settings application icon, a Recorder application icon, and an AppGallery application icon. In other words, the third page 521 may include some application icons in a second column of application icons and a third column of application icons on the first page 502.

When the user continues to slide left on the third page 521 of the large folder on the interface 520 shown in FIG. 5E(b), for example, slides again for the distance x, an interface 530 shown in FIG. 5E(c) may be displayed. The interface 530 may include a fourth page 531 of the large folder, and may include the Calculator application icon, the Browser application icon, the Recorder application icon, the AppGallery application icon, and the Calendar application icon. In other words, the fourth page 531 may include a second column of application icons and a third column of application icons on the second page 503.

When the user wants to slide the page 531 of the large folder back to the page 502, the user may first slide the page 531 back to the page 521 by the distance x in a direction of a black arrow shown in FIG. 5E(c), and then continue to slide the page 521 back to the page 502 by the distance of x by using a same operation. Certainly, the user may alternatively directly slide on the page 531 of the large folder for a distance of 2x, and then directly slide the page 531 of the large folder back to the page 502. This is not specifically limited in this application.

Figure 5F:
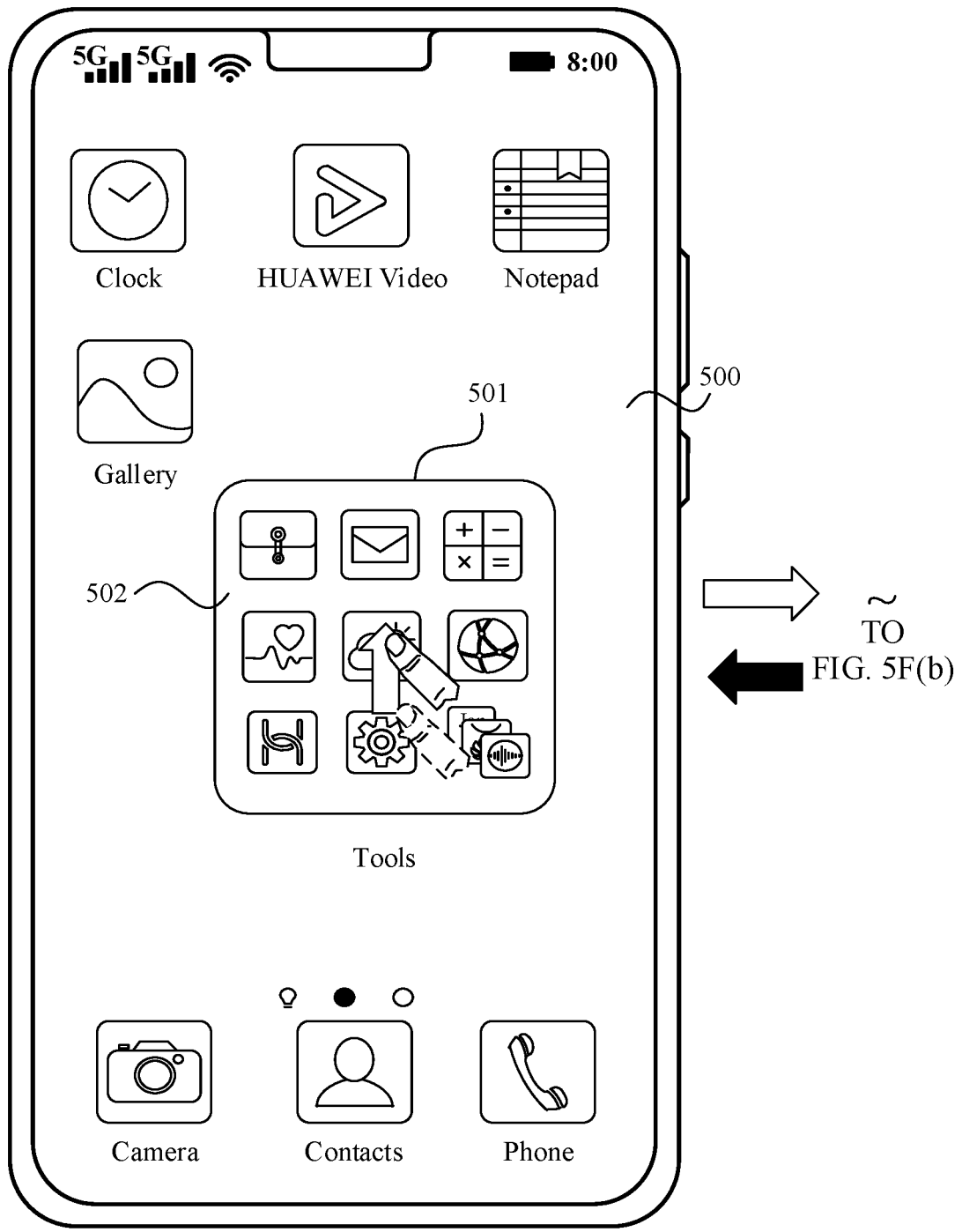
FIG. 5F(a) and FIG. 5F(b) are a schematic diagram of a user interface according to an embodiment of this application.
Figure 5F:
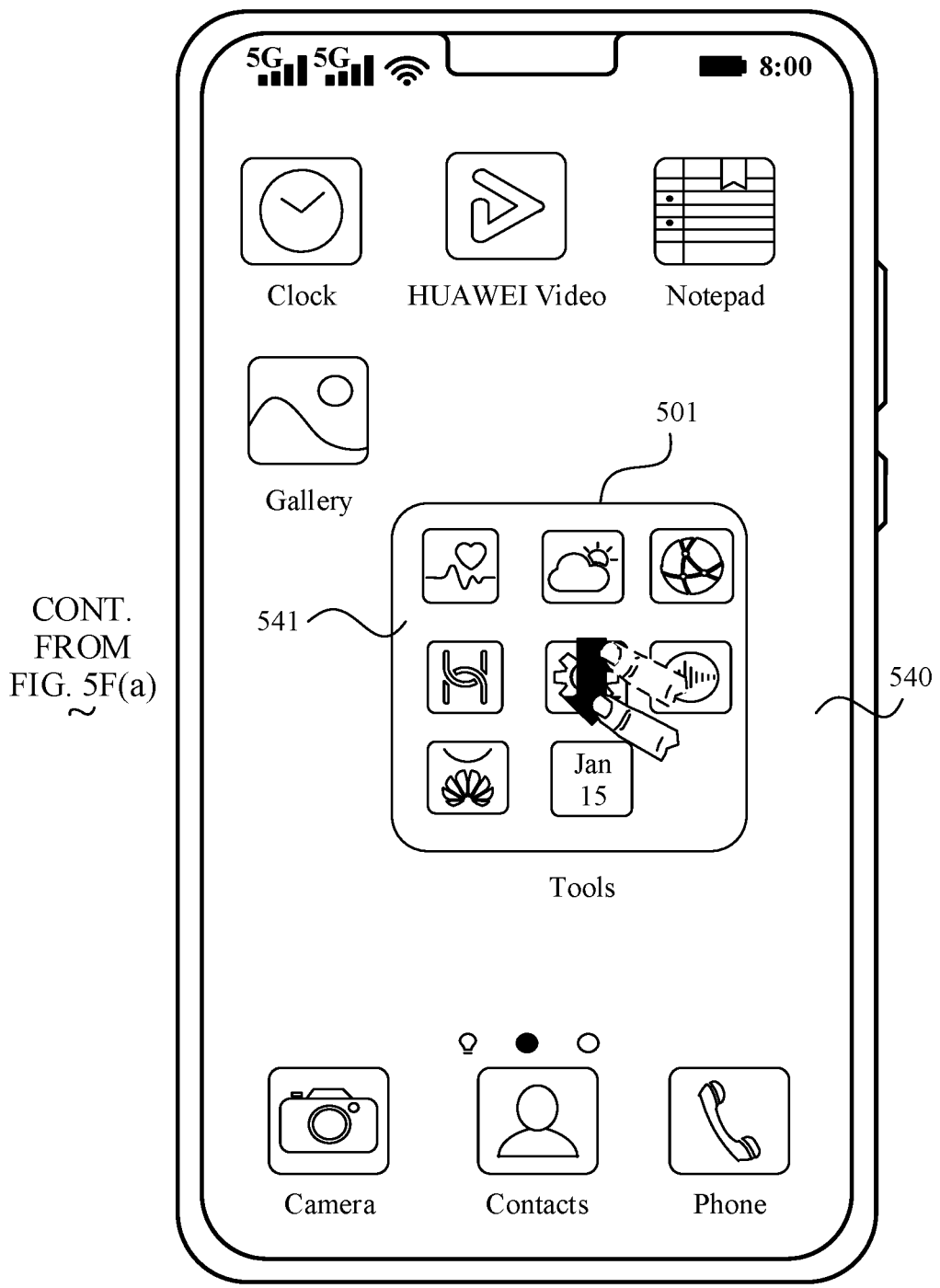

As shown in FIG. 5F(a) and FIG. 5F(b), it is assumed that the user slides from bottom to top on the first page 502 of the large folder 501 on an interface shown in FIG. 5F(a), and a sliding distance is x. The mobile phone 100 may detect the slide operation, respond to the slide operation, and then display an interface 540 shown in FIG. 5F(b). The interface 540 may include a fifth page 541 of the large folder. For example, the fifth page 541 may include a Health application icon, the Weather application icon, the Browser application icon, an AI Life application icon, the Settings application icon, the Recorder application icon, the AppGallery application icon, and the Calendar application icon. In other words, the fifth page 541 may include some application icons in a second row of application icons and a third row of application icons on the first page 502.

Certainly, if the user wants to slide the page 541 of the large folder back to the page 502, the user may slide from top to bottom, and then slide the page 541 back to the page 502. It should be noted that black arrows on the interfaces in FIG. 5B(a) to FIG. 5F(b) represent a gesture operation of sliding back a page. In actual application, a position of the gesture operation may alternatively be another position, and is not limited to a position of the arrow shown in the figure.

It should be understood that the third page, the fourth page, and the fifth page may be understood as subpages of the second page. Certainly, when the touch target is set as the entire large folder, a corresponding application icon may not be displayed based on a sliding distance of the user. In other words, each time the user slides, a current page may be switched to a next page.

According to the foregoing embodiments, the user may perform a slide operation on the large folder, to implement page switching of the large folder. This helps the user search for an application, improves operation efficiency of searching for the application by the user, and therefore improves user experience.

S404: The mobile phone 100 displays a second interface in response to the first operation.

Figure 6A:
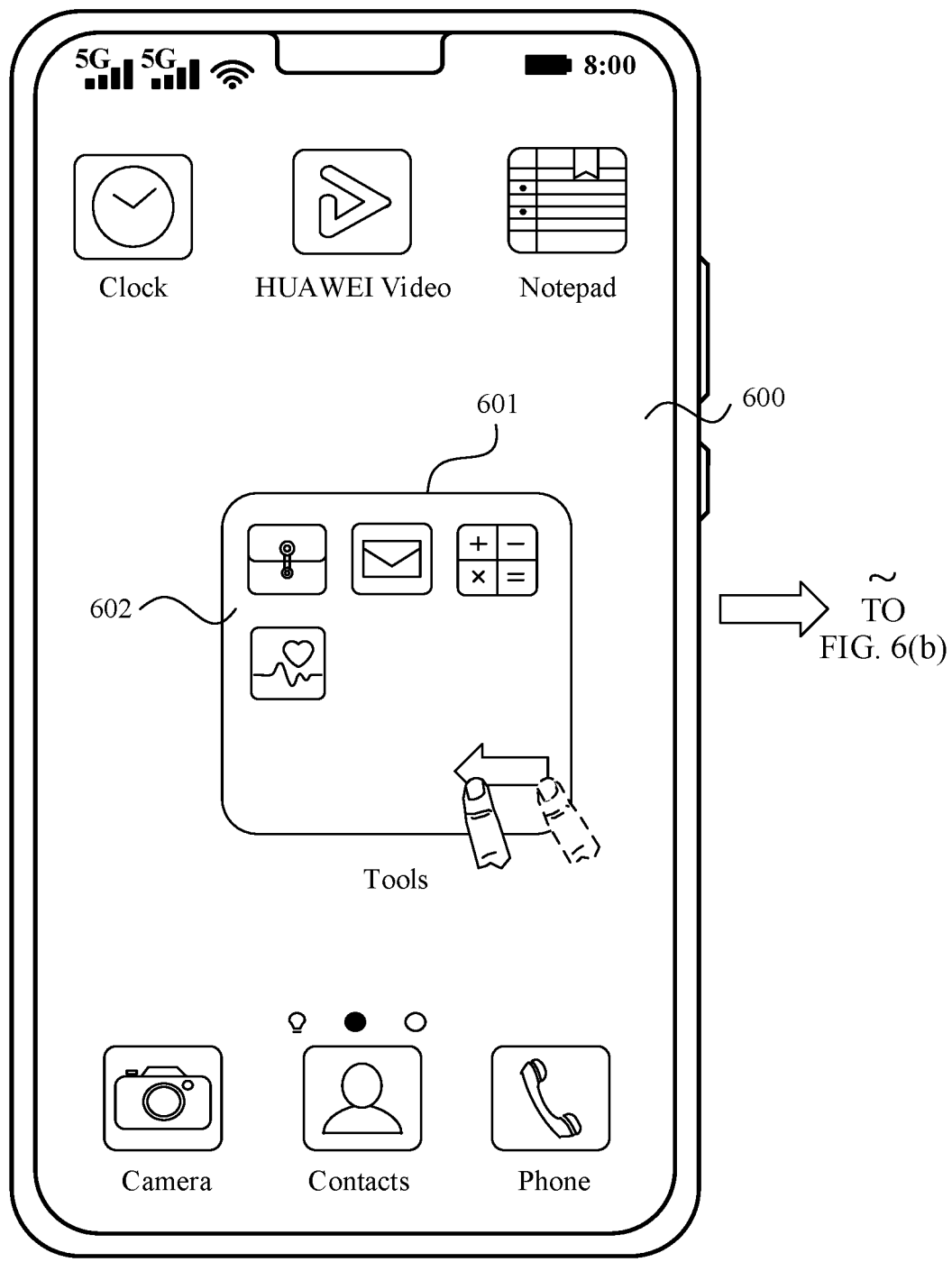
FIG. 6(a) and FIG. 6(b) are a schematic diagram of a user interface according to an embodiment of this application.
Figure 6B:
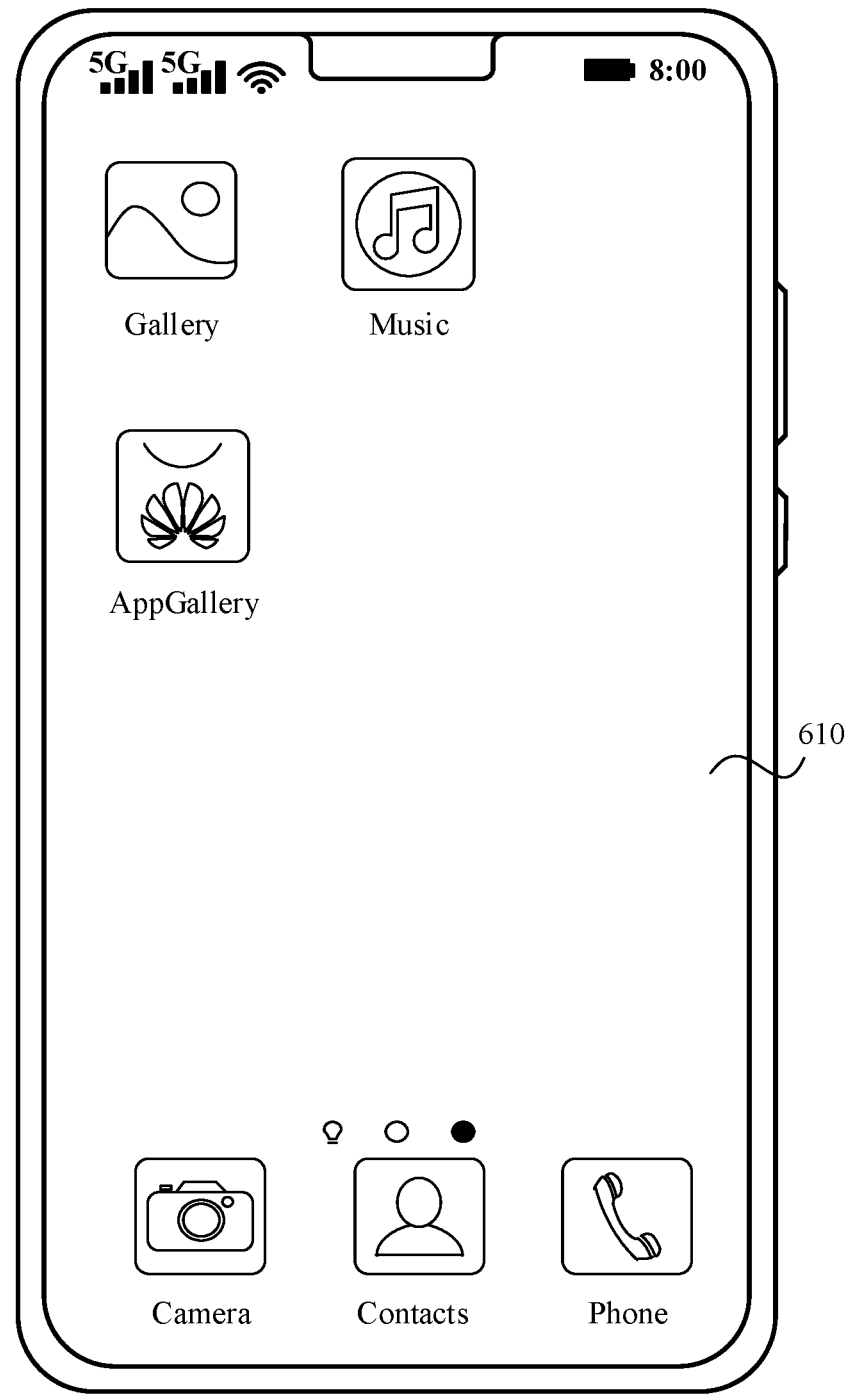

When the quantity of applications included in the large folder is less than the specified quantity, when detecting the first operation, the mobile phone 100 may respond to the first operation, and switch a display interface of a desktop. For example, as shown in FIG. 6(a) and FIG. 6(b), it is assumed that the mobile phone 100 displays a desktop shown in FIG. 6(a), for example, a home screen 600. The interface 600 may include a large folder 601 and a first page 602 of the large folder. For example, the first page 602 may include a Files application icon, an Email application icon, a Calculator application icon, and a Health application icon. When the user performs a slide operation at the position of the touch target of the large folder, for example, the position of the ninth application icon, the mobile phone 100 may display an interface 610 shown in FIG. 6(b) in response to the slide operation. The interface 610 is an interface obtained after the home screen 600 is slid. It should be understood that if the first operation of the user is an operation in a non-large-folder area, the mobile phone 100 may also respond to the first operation, and slide the desktop to a next interface.

It should be noted that, when a quantity of applications included in the large folder is less than the specified quantity, for example, less than 8, the large folder still has a touch target. However, in this case, if the first operation is performed on the large folder, the large folder does not respond to the first operation.

Figure 7A:
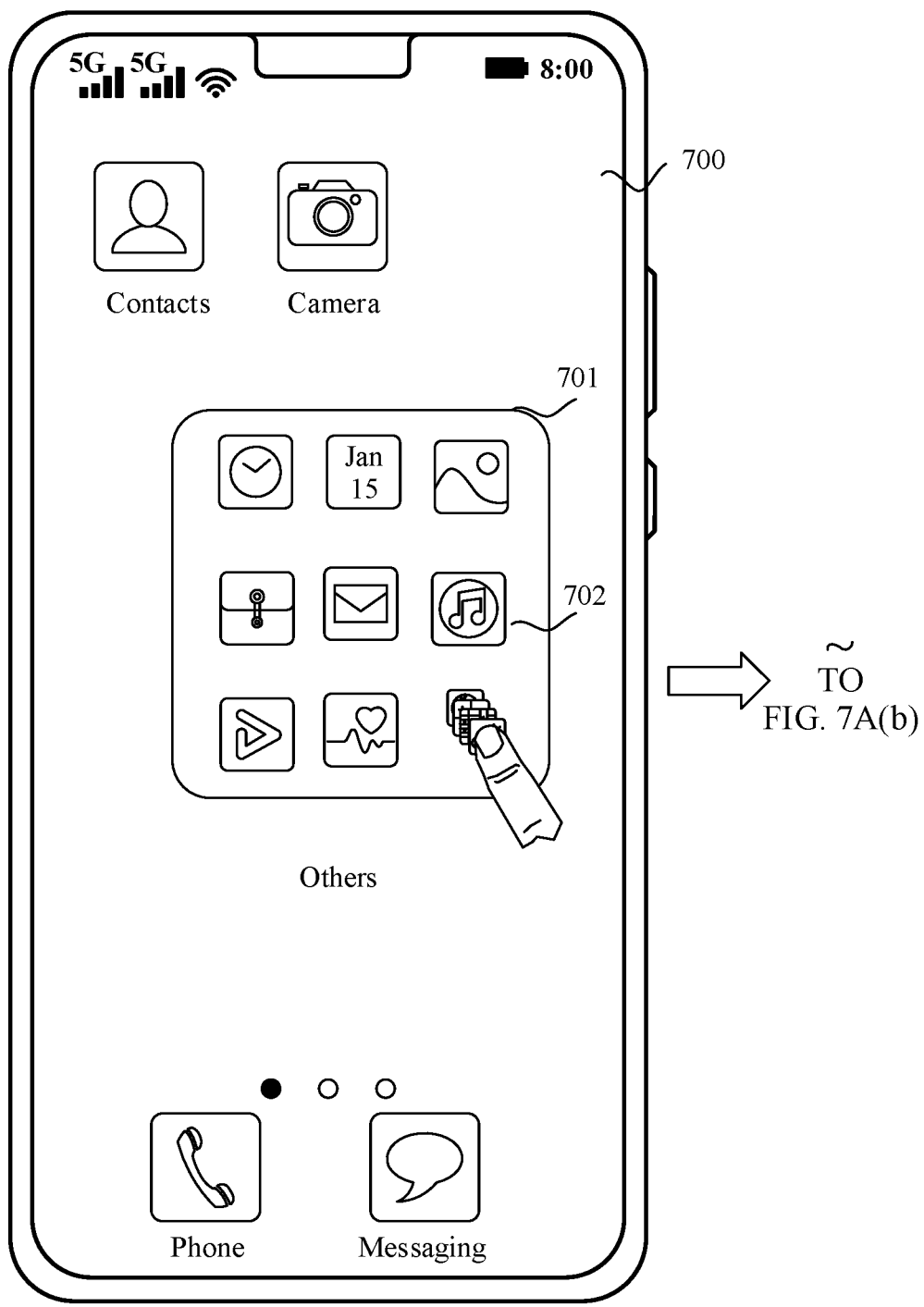
FIG. 7A(a) to FIG. 7A(c) are a schematic diagram of a user interface according to an embodiment of this application.
Figure 7A:
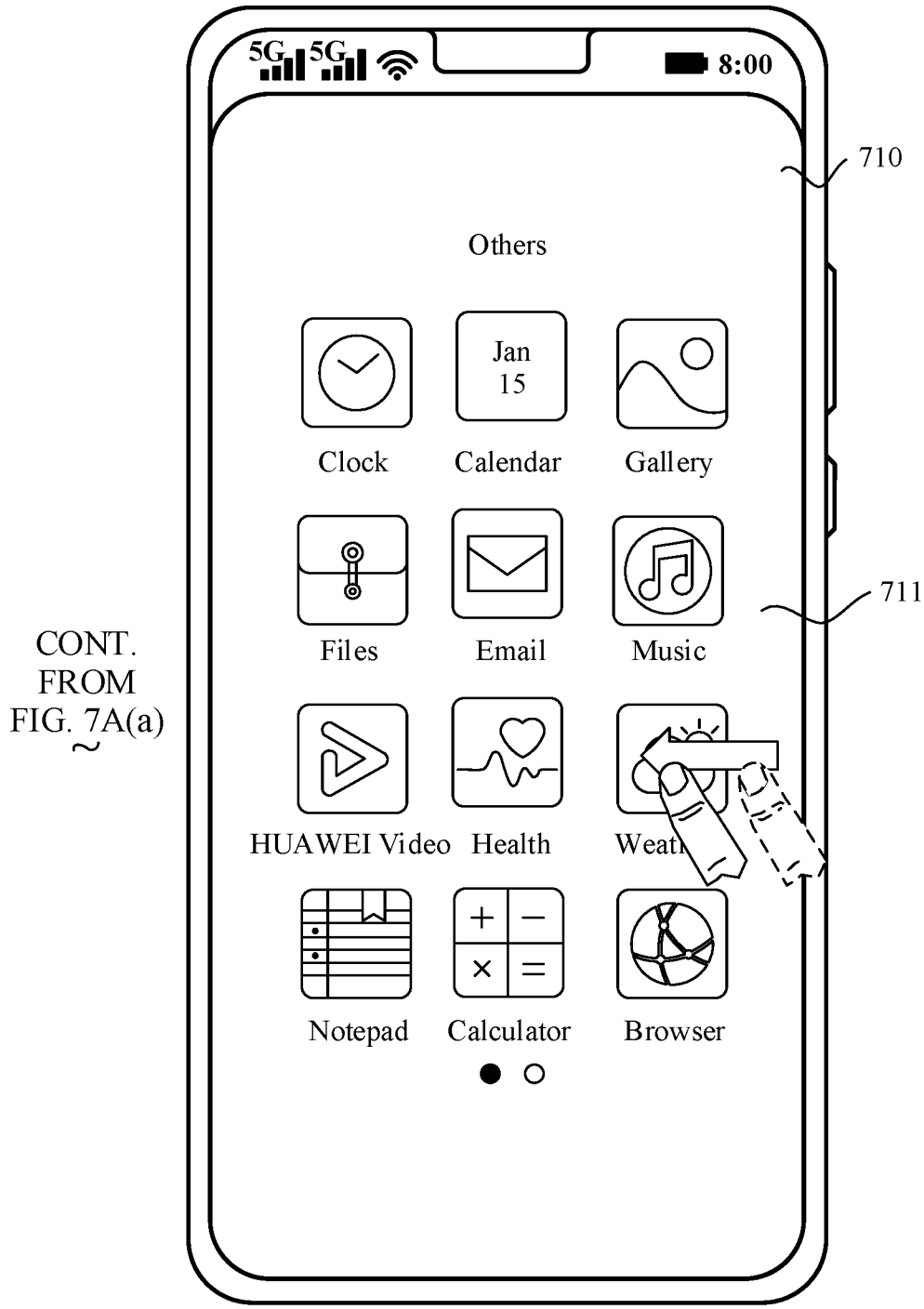
Figure 7A:
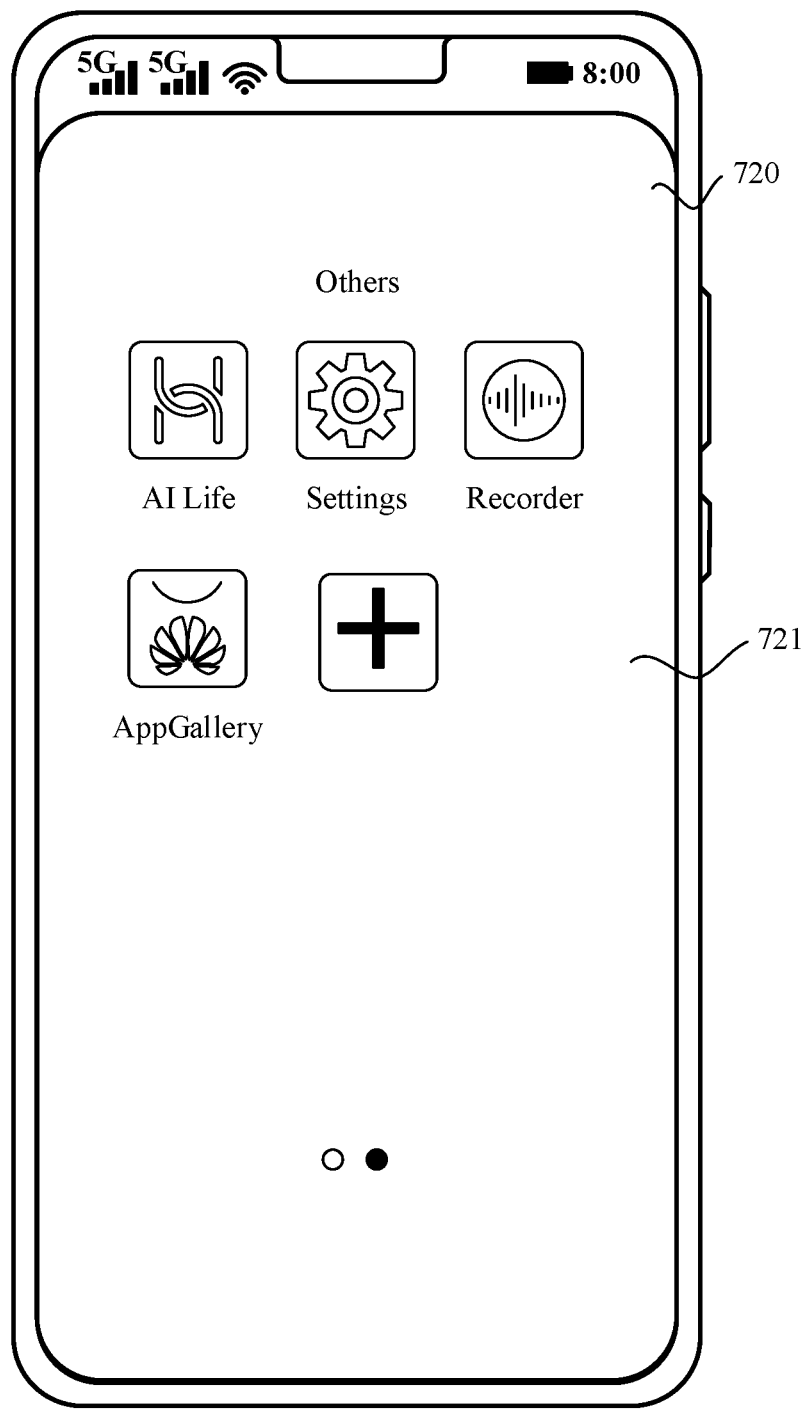

Further, different habits of users are considered, some users may expand the large folder, and then find, on an expanded page, an application that needs to be opened. For example, as shown in FIG. 7A(a) to FIG. 7A(c), it is assumed that the mobile phone displays an interface 700 shown in FIG. 7A(a). The interface 700 may include a large folder 701 and a first page 702 of the large folder. It is assumed that the large folder 701 includes more than 12 application icons, for example, 16 application icons. The user may tap a position of a ninth application icon on the first page 702, and then the mobile phone may expand the large folder in response to the tapping operation of the user. For example, the mobile phone may display an interface 710 shown in FIG. 7A(b). A first page 711 obtained after the large folder 701 is expanded may be displayed on the interface 710. In other words, a first application icon to a twelfth application icon are displayed.

After the user slides from right to left on the first page 711, for example, slides in a gesture direction shown in the figure, the mobile phone may display an interface 720 shown in FIG. 7A(c) in response to the slide operation, that is, slide the interface 710 to the interface 720. The interface 720 may include a second page 721 obtained after the large folder is expanded, namely, a thirteenth application icon to a sixteenth application icon. It should be understood that, when the large folder includes more application icons, if the large folder is expanded, a first application icon to a twelfth application icon are displayed on a first page obtained after the large folder is expanded, and a thirteenth application icon to a twenty-fourth application icon are displayed on a second page obtained after the large folder is expanded. Subsequent pages may be deduced by analogy in the foregoing manner.

Figure 7B:
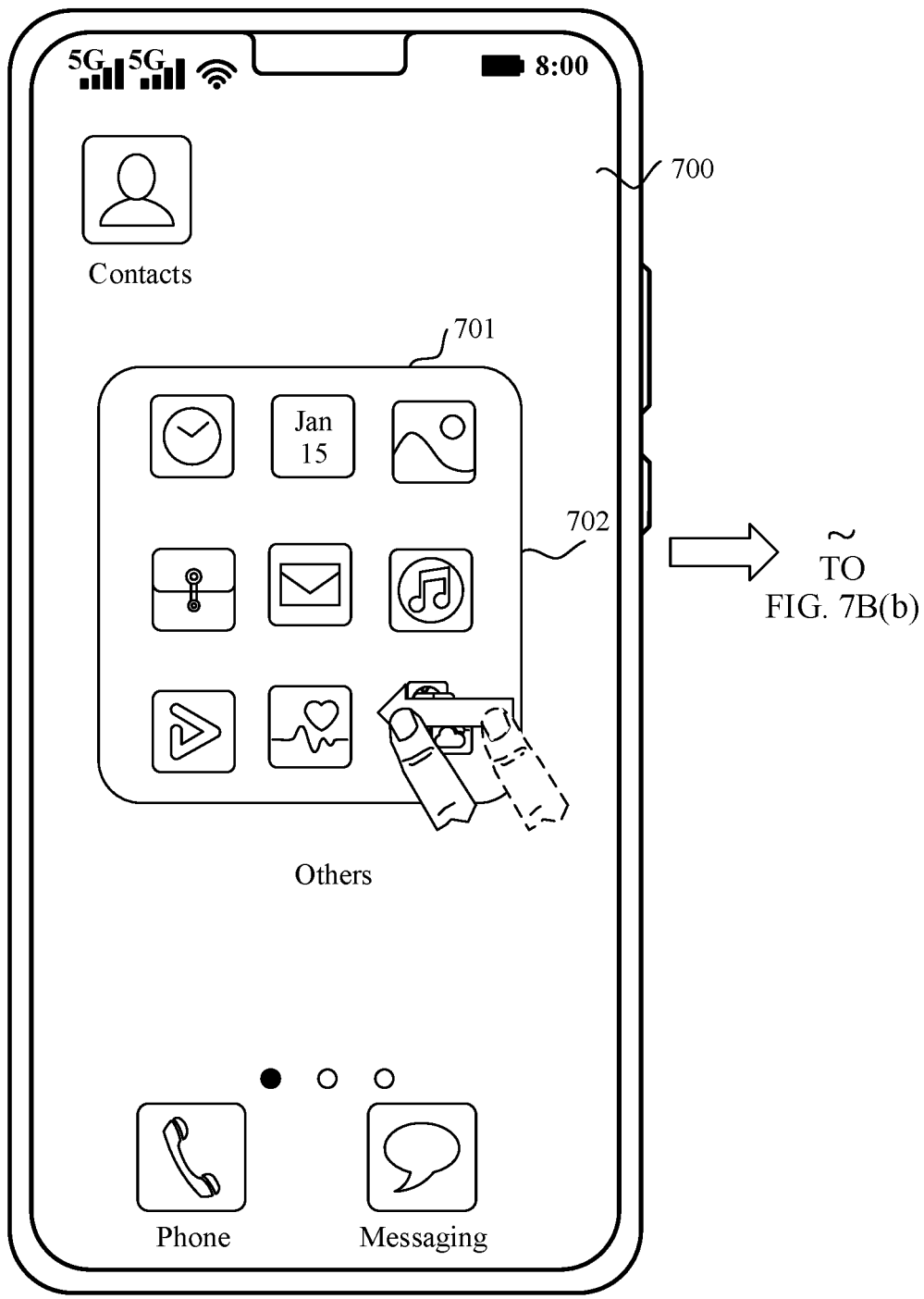
FIG. 7B(a) to FIG. 7B(c) are a schematic diagram of a user interface according to an embodiment of this application.
Figure 7B:
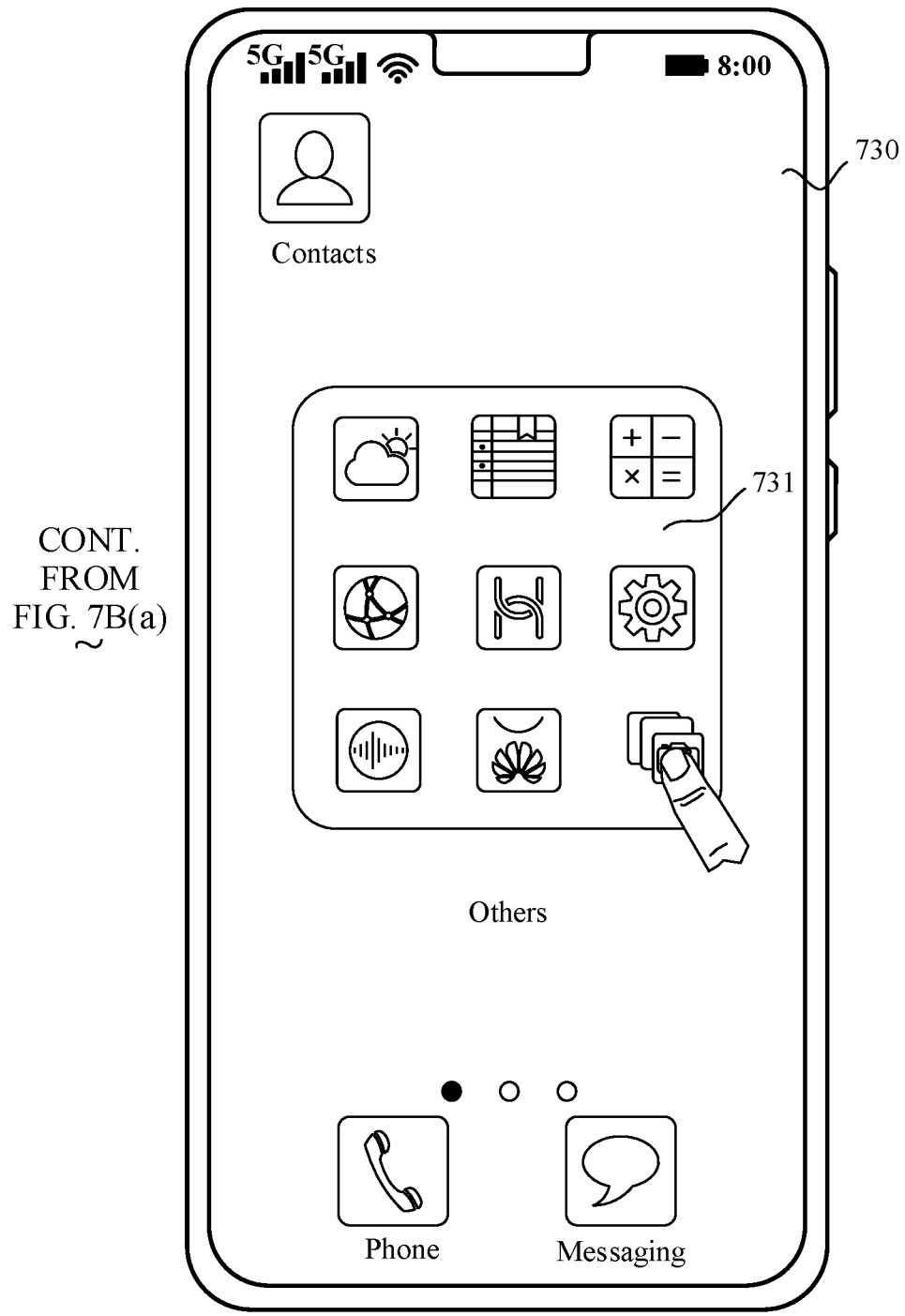
Figure 7B:
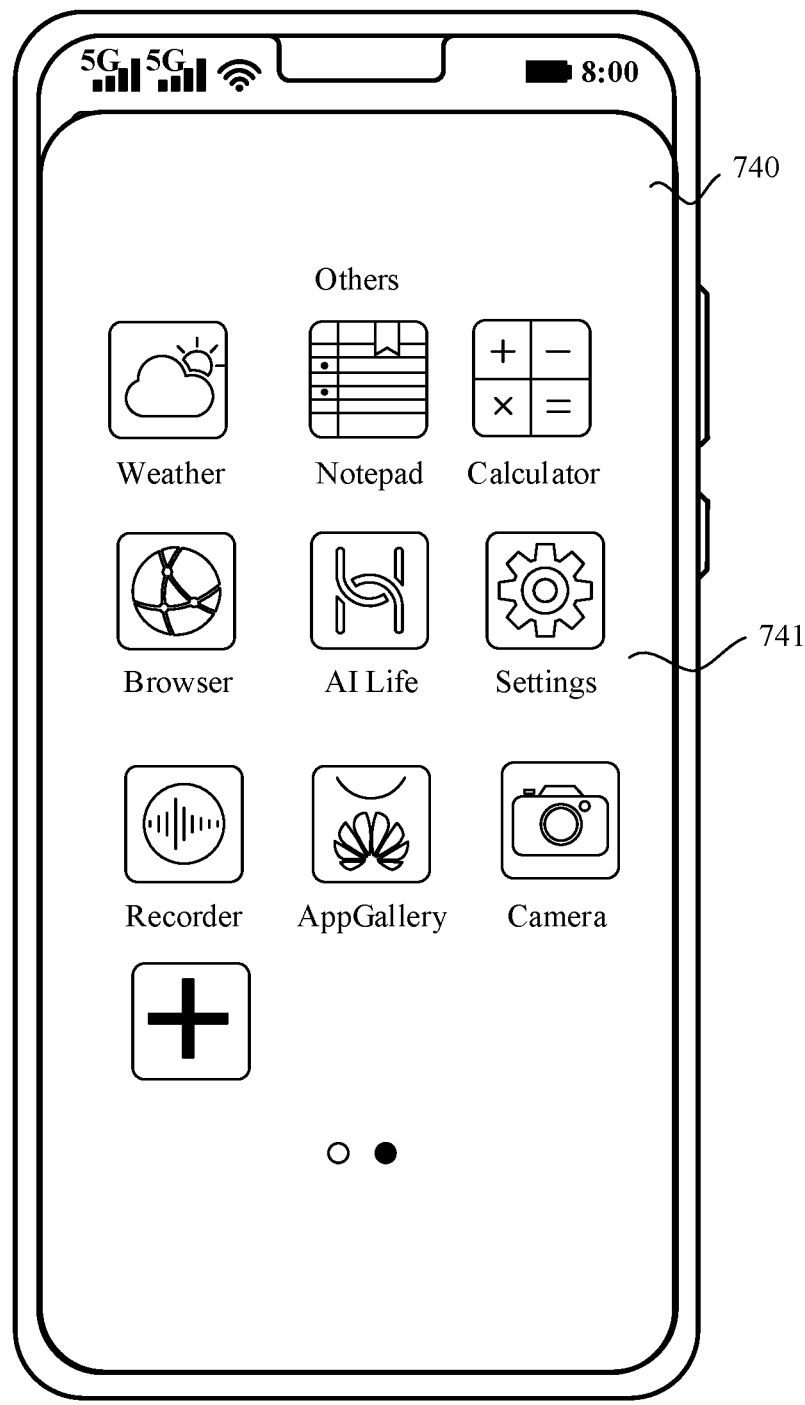

An example in which the large folder 701 includes more than 12 application icons, for example, 17 application icons, is used. As shown in FIG. 7B(a) to FIG. 7B(c), it is assumed that the mobile phone displays an interface 700 shown in FIG. 7B(a). The interface 700 may include a large folder 701 and a first page 702 of the large folder. After the user slides in a direction shown in the figure at a position of a ninth application icon, the mobile phone may slide the first page 702 of the large folder to a next page in response to the slide operation, for example, may display an interface 730 shown in FIG. 7B(b). The interface 730 may include a second page 731 of the large folder. A first application icon on the page 731 is a ninth application icon included in the large folder. In other words, application icons displayed on the page 731 start from the ninth application icon included in the large folder.

In this case, if the user wants to expand the page 731, the user may tap a position of a ninth application icon on the page 731, namely, a position at which a stacking effect is displayed. The mobile phone may expand the page 731 in response to the tapping operation of the user, for example, may display an interface 740. The interface 740 may include application icons obtained after the second page 731 of the large folder is expanded, namely, a page 741. For example, the ninth application icon to a seventeenth application icon of the large folder may be displayed. It should be understood that, when the large folder includes more application icons, if the large folder is expanded, the ninth application icon to a twentieth application icon may be displayed on the second page obtained after the large folder is expanded, and subsequent pages may be displayed by analogy.

Figure 7C:
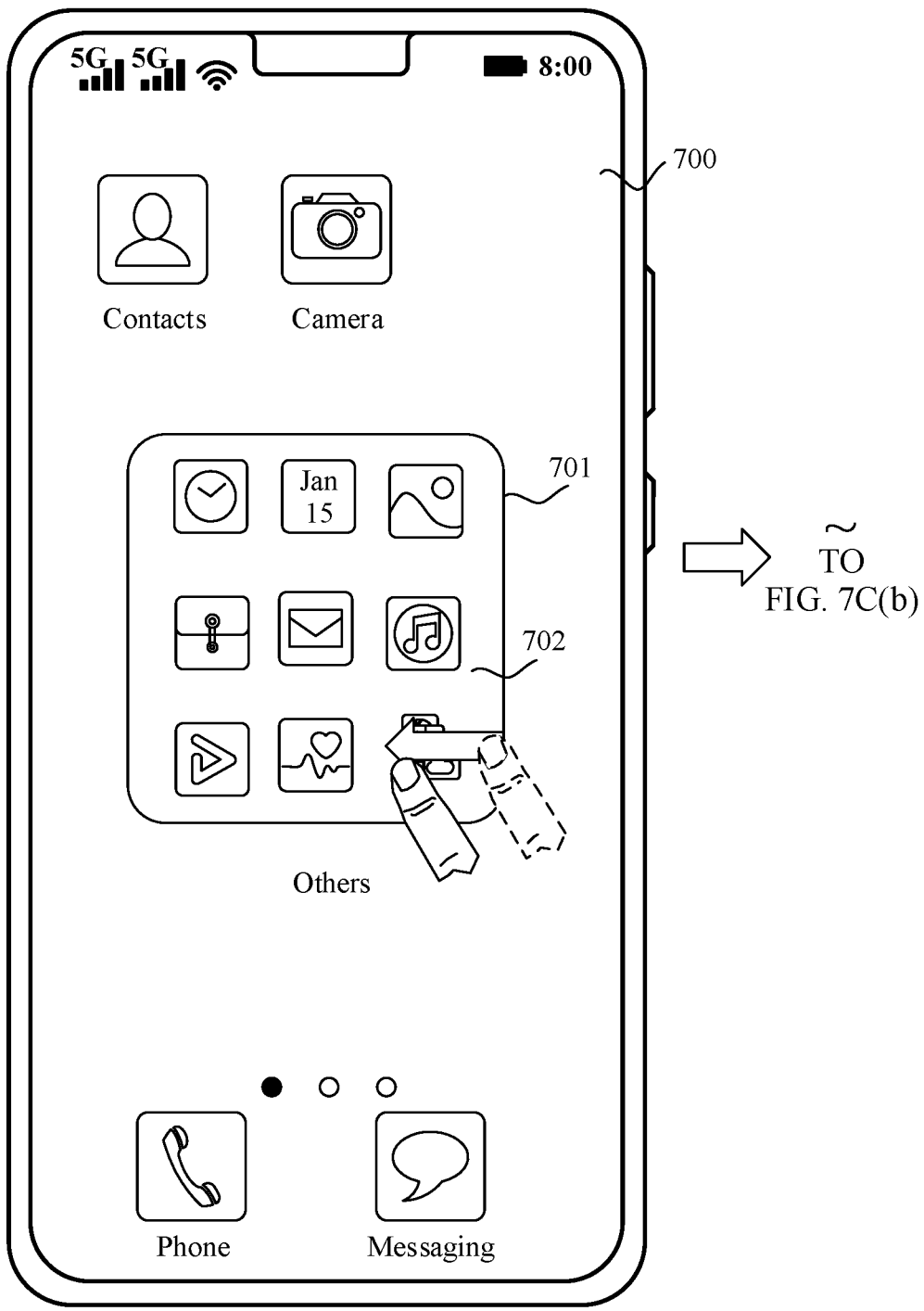
FIG. 7C(a) to FIG. 7C(c) are a schematic diagram of a user interface according to an embodiment of this application.
Figure 7C:
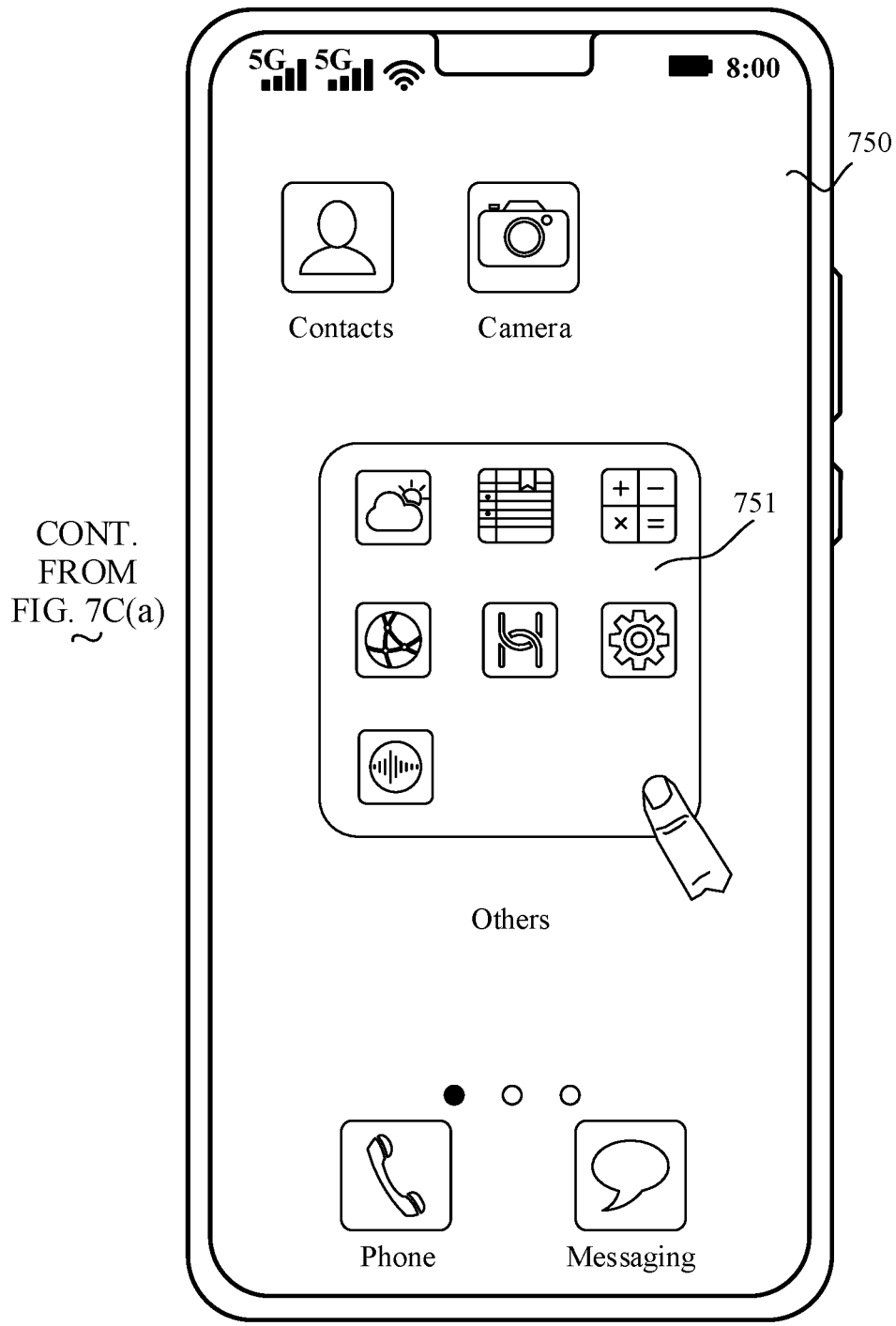
Figure 7C:
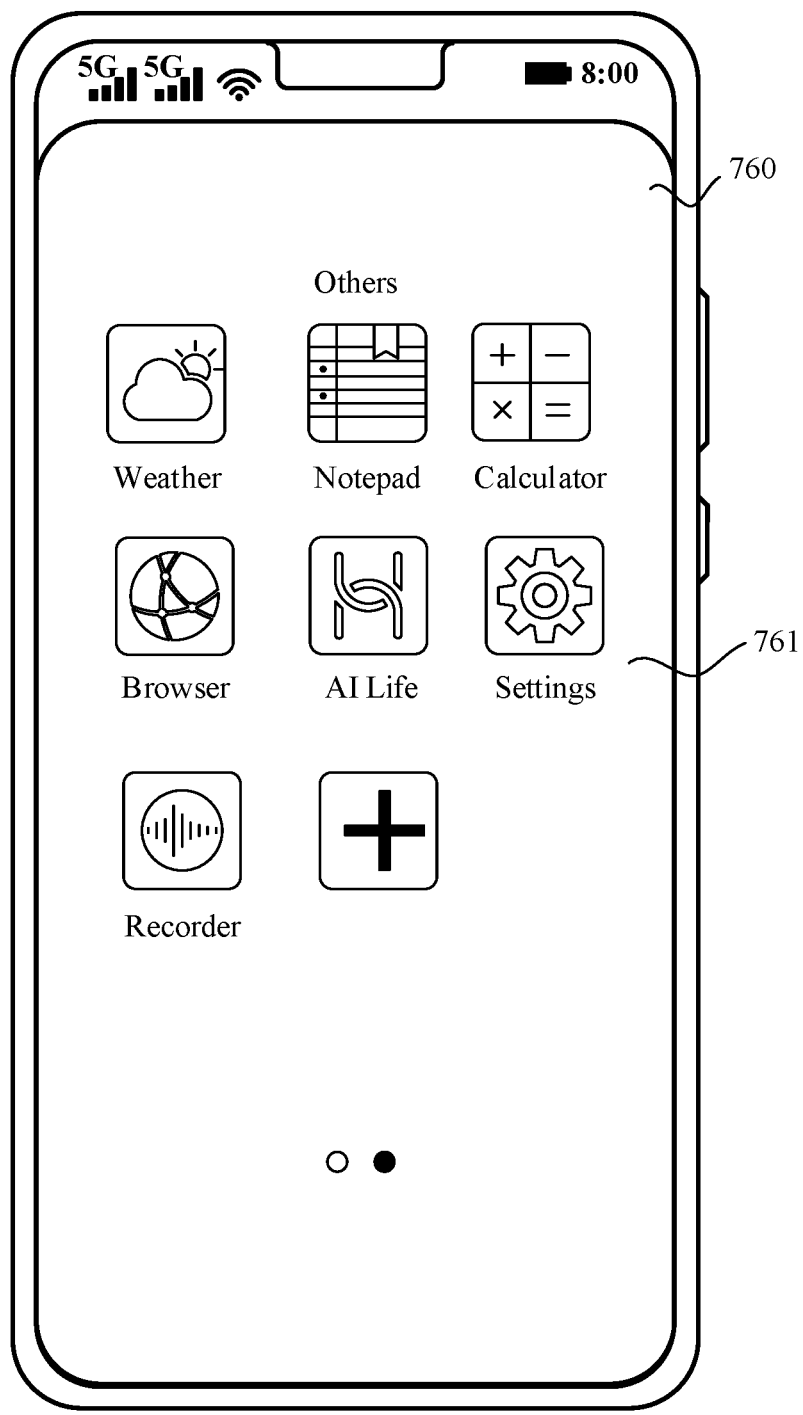

In another example, it is assumed that the large folder 701 includes more than 12 application icons, for example, 15 application icons. It is assumed that an interface 700 shown in FIG. 7C(a) is displayed, and the interface 700 may include a large folder 701 and a first page 702 of the large folder. After the user slides in a direction shown in the figure at a position of a ninth application icon, the mobile phone may slide the first page 702 of the large folder to a next page in response to the slide operation, for example, may display an interface 750 shown in FIG. 7C(b). The interface 750 may include a second page 751 of the large folder. A first application icon on the page 751 is a ninth application icon included in the large folder. In this case, if the user wants to expand the page 751, the user may tap a position of a ninth application icon on the page 751. The mobile phone may expand the page 751 in response to the tapping operation of the user, for example, may display an interface 760. The interface 760 may include application icons obtained after the second page 751 of the large folder is expanded, namely, a page 761. For example, the ninth application icon to a fifteenth application icon of the large folder may be displayed.

Figure 7D:
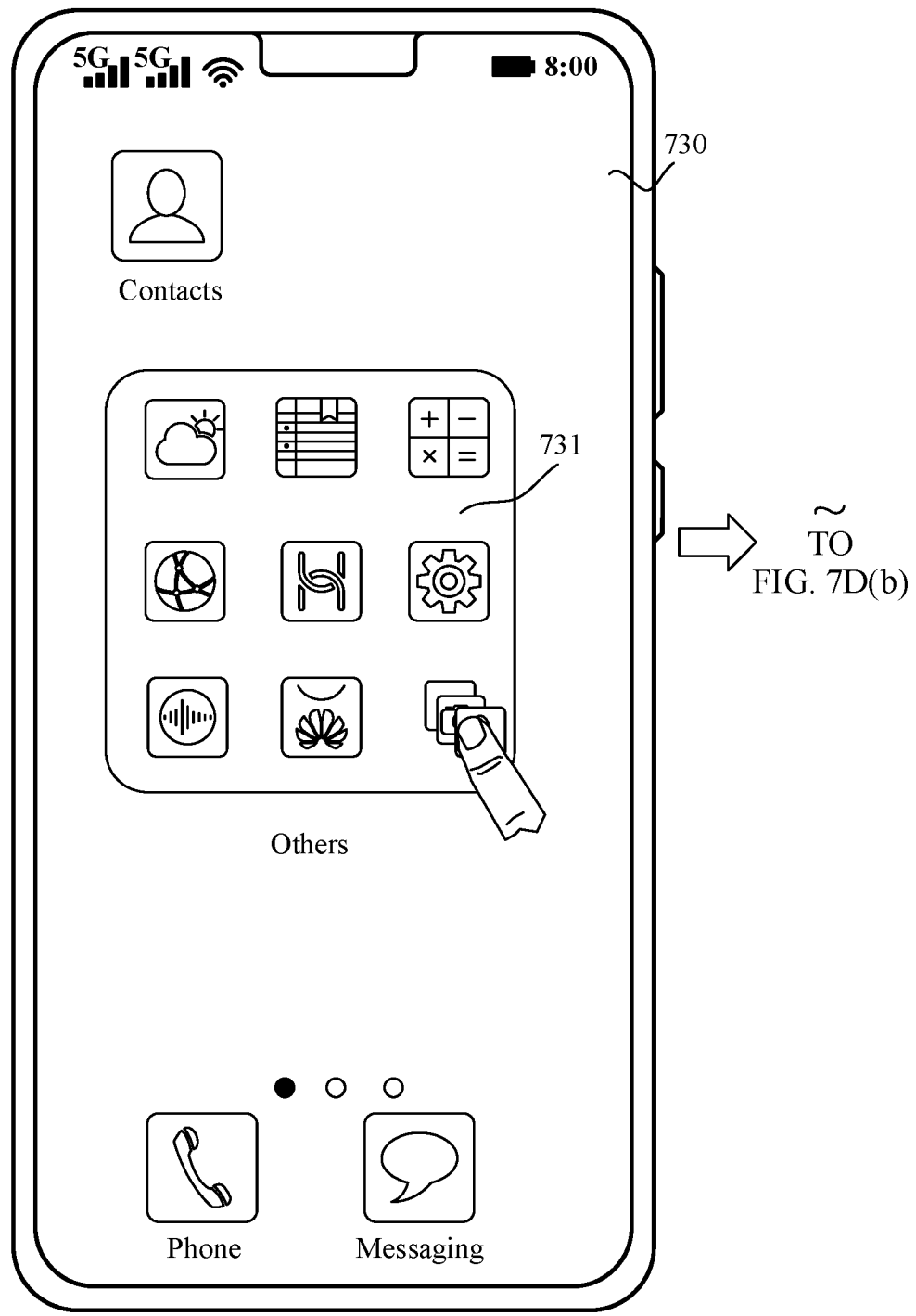
FIG. 7D(a) and FIG. 7D(b) are a schematic diagram of a user interface according to an embodiment of this application.
Figure 7D:
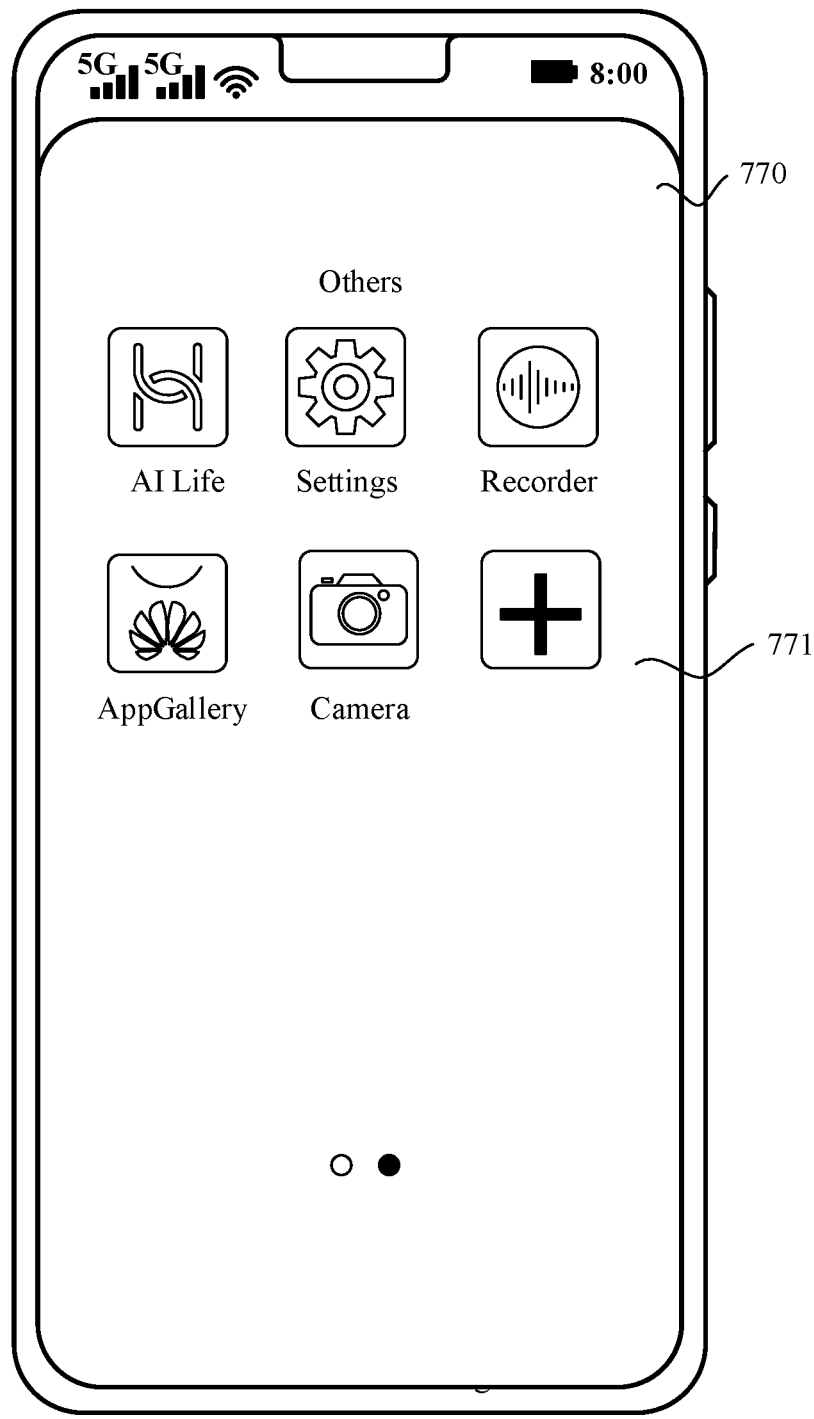

An example in which the large folder 701 includes more than 12 application icons, for example, 17 application icons, is still used. As shown in FIG. 7D(a) and FIG. 7D(b), it is assumed that the mobile phone displays an interface 730 shown in FIG. 7D(a). The interface 730 may include a second page 731 of the large folder. A first application icon on the page 731 is a ninth application icon included in the large folder. In other words, application icons displayed on the page 731 start from the ninth application icon included in the large folder. In this case, if the user wants to expand the page 731, the user may tap a position of a ninth application icon on the page 731, namely, a position at which a stacking effect is displayed. The mobile phone may expand the page 731 in response to the tapping operation of the user, for example, may display an interface 770 shown in FIG. 7D(b). The interface 770 may include a page 771 obtained after the second page of the folder is expanded, for example, may display a thirteenth application icon to a seventeenth application icon of the large folder. It should be understood that, when the large folder includes more application icons, if the large folder is expanded, the thirteenth application icon to a twenty-fourth application icon may be displayed on the second page obtained after the large folder is expanded, and subsequent pages may be displayed by analogy.

In other words, in embodiments of this application, when a large folder includes a large quantity of applications, for example, more than 24, if the large folder is expanded on a second page of the large folder, a first application icon in application icons displayed on an expanded page may be a thirteenth application icon of the large folder, and a last application icon on the expanded page may be a twenty-fourth application icon of the large folder. Alternatively, a first application icon in application icons displayed on an expanded page may be a ninth application icon of the large folder, and a last application icon on the expanded page may be a twentieth application icon of the large folder. This is not limited in this application.

Figure 8:
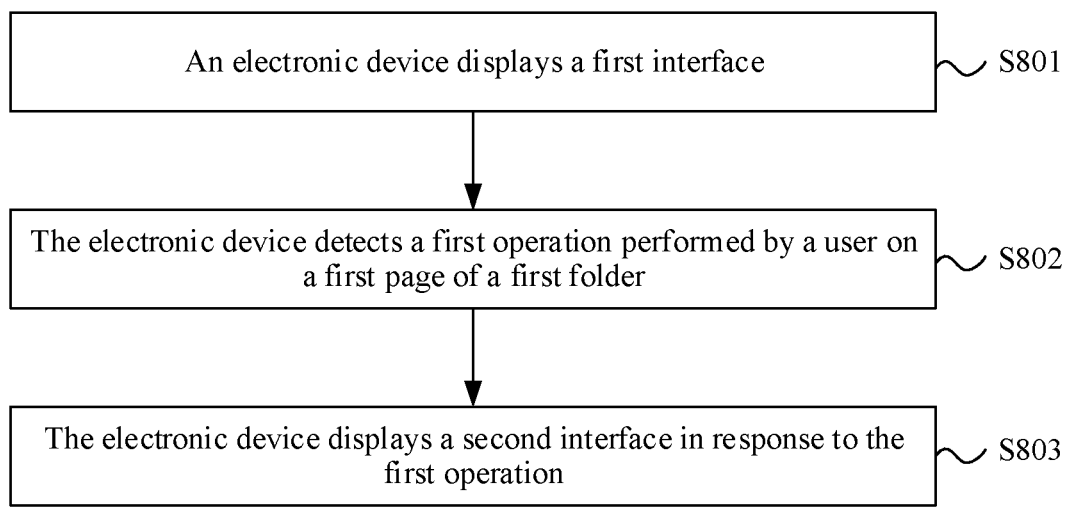
FIG. 8 is a flowchart of a display method according to an embodiment of this application.

According to the foregoing embodiments, this application further provides a display method. FIG. 8 is a flowchart of the display method according to an embodiment of this application. As shown in FIG. 8, the method may include the following steps.

S801: An electronic device displays a first interface.

The first interface includes at least one control and a first folder, and the at least one control is displayed outside the first folder. The first folder may include a plurality of pages, for example, a first page and a second page, the first page includes at least one application icon, and the second page includes at least one application icon.

S802: The electronic device detects a first operation performed by a user on the first page of the first folder.

It should be understood that the first page of the first folder may be displayed on the first interface, and the first operation is an operation performed by the user on the first page of the first folder on the first interface.

S803: The electronic device displays a second interface in response to the first operation.

The second interface includes the at least one control and the second page. The second page herein is the second page of the first folder.

FIG. 5B(a) and FIG. 5B(b) are used as an example. It is assumed that the mobile phone displays an interface 500 shown in FIG. 5B(a). The interface 500 may include a first folder 501 and at least one control, for example, an application icon other than the first folder 501, for example, a Camera application icon or a Gallery application icon. A first page 502 of the first folder may be displayed on the interface 500. When the mobile phone detects the first operation performed by the user on the first page 502, for example, a right-to-left slide operation shown in the figure, the mobile phone may slide the first page 502 of the first folder 501 to a next page in response to the slide operation, for example, display a second page 511 shown in FIG. 5B(b).

Figure 9A:
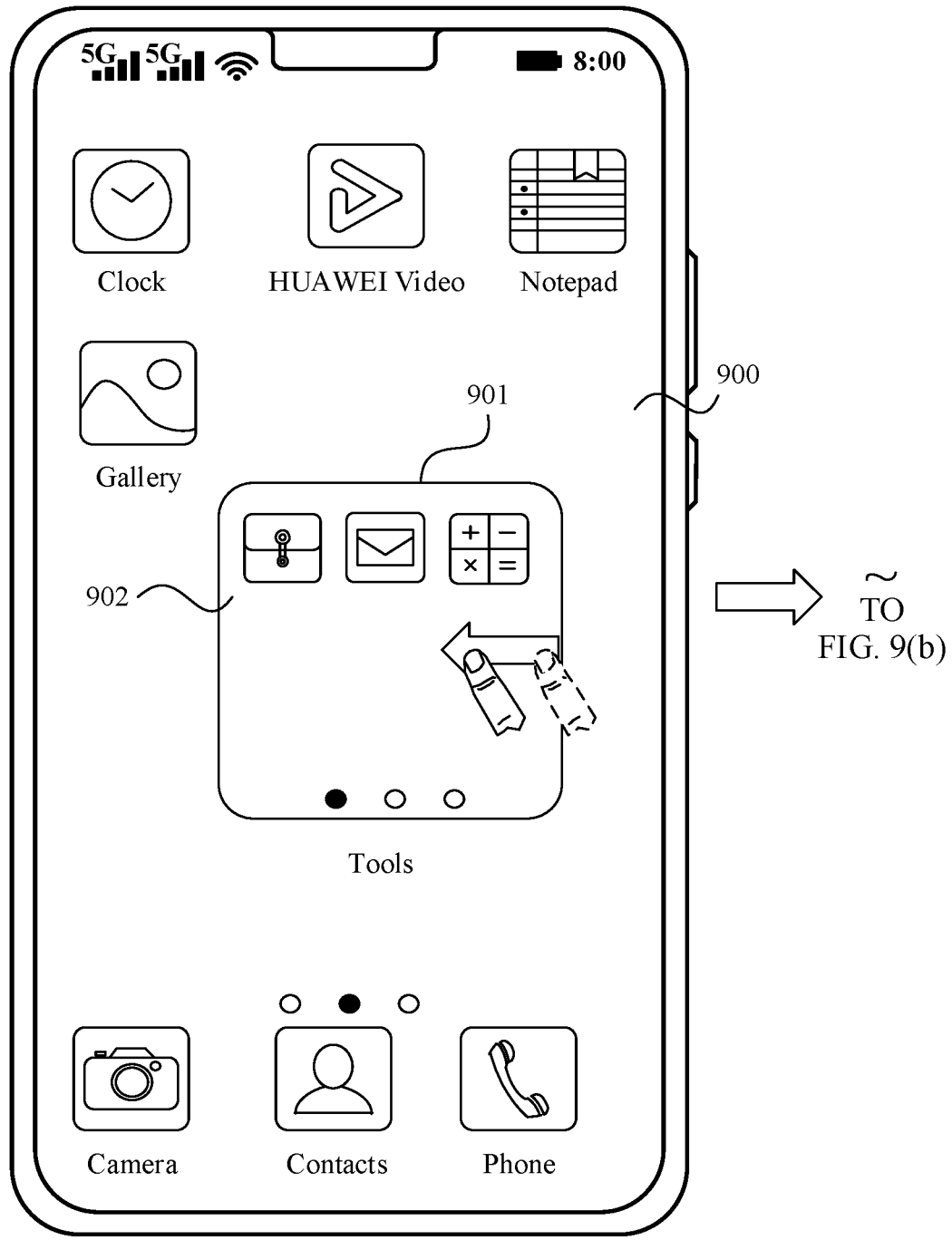
FIG. 9(a) and FIG. 9(b) are a schematic diagram of a user interface according to an embodiment of this application.
Figure 9B:
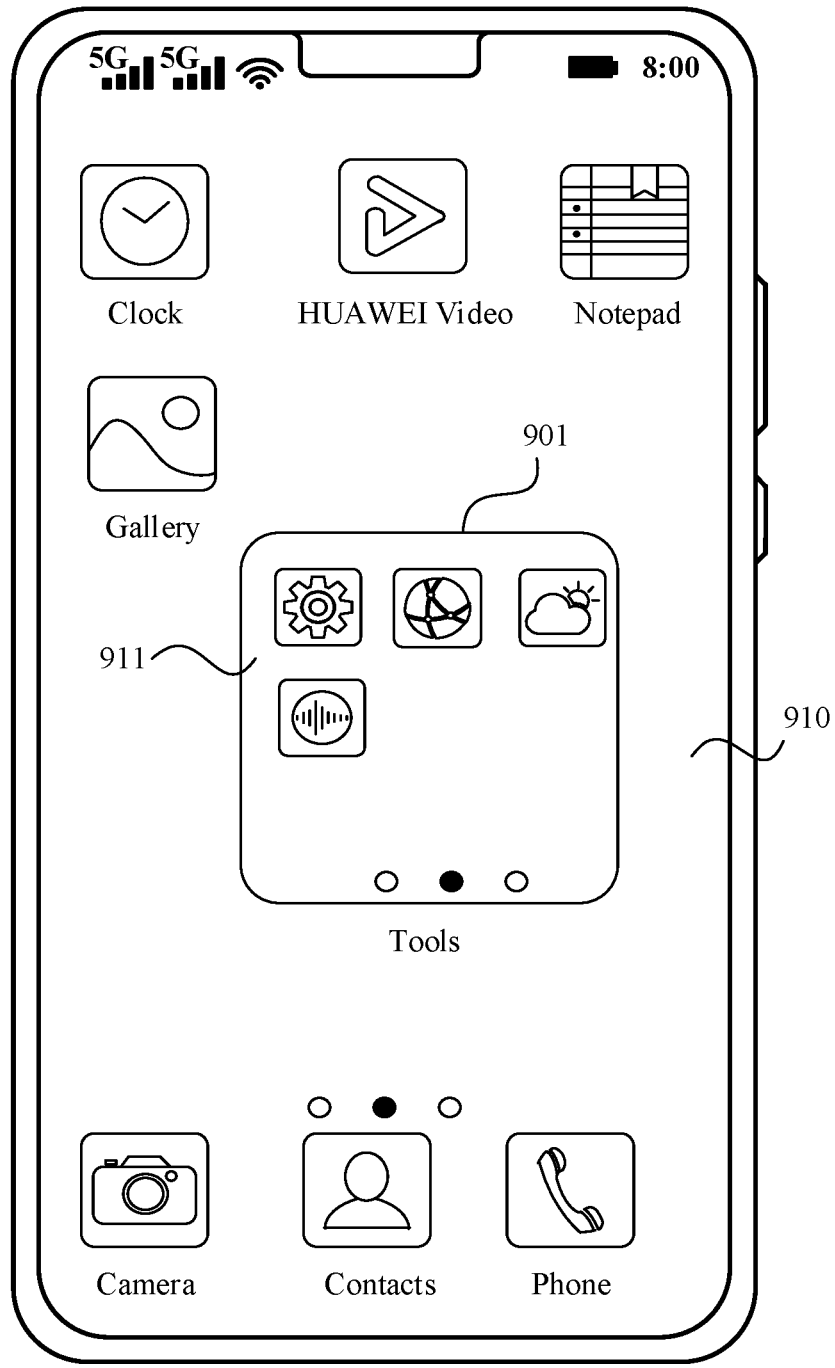

In another example, as shown in FIG. 9(a) and FIG. 9(b), it is assumed that the mobile phone displays an interface 900 shown in FIG. 9(a), and the interface 900 may include a first folder 901 and at least one control other than the first folder 901. A first page 902 of the first folder 901 may be displayed on the interface 900. The page 902 may include, for example, a Files application icon, an Email application icon, and a Calculator application icon shown in the figure. When the mobile phone detects the first operation performed by the user on the first page 902, for example, a right-to-left slide operation shown in the figure, the mobile phone may display an interface 910 shown in FIG. 9(b) in response to the slide operation. The interface 910 may include a second page 911 of the first folder 901, and the second page 911 may include a Settings application icon, a Browser application icon, a Weather application icon, and a Recorder application icon.

It should be noted that, for a specific implementation process of the embodiment shown in FIG. 8 and the embodiments shown in FIG. 9(a) and FIG. 9(b), refer to the detailed description in the foregoing embodiments. Details are not described herein again.

It should be noted that all or some of the foregoing embodiments provided in this application may be freely and randomly combined with each other. The combined technical solutions also fall within the protection scope of this application.

In embodiments provided in this application, the method provided in embodiments of this application is described from a perspective of the electronic device as an execution body. To implement functions in the method provided in embodiments of this application, the electronic device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 10:
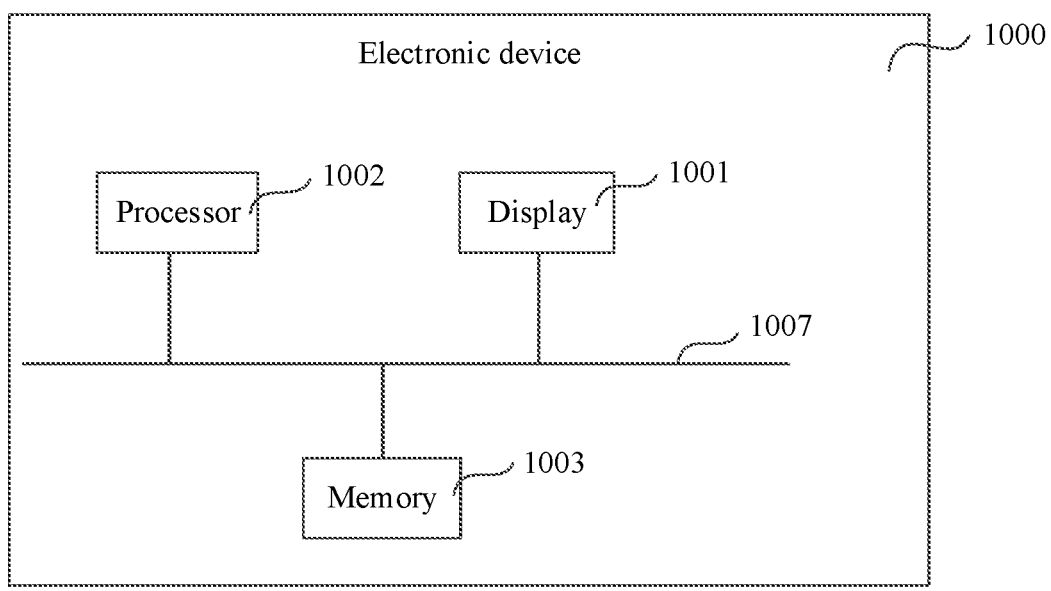
FIG. 10 is a schematic diagram of a structure of another electronic device according to an embodiment of this application.

As shown in FIG. 10, some other embodiments of this application disclose an electronic device. The electronic device may be an electronic device having a display. As shown in FIG. 10, an electronic device 1000 includes a display 1001, one or more processors 1002, one or more memories 1003, one or more sensors 1004 (not shown in the figure), a plurality of applications 1005 (not shown in the figure), and one or more computer programs 1006 (not shown in the figure). The components may be connected through one or more communication buses 1007.

The display 1001 is configured to display a display interface of an application in the electronic device, or display prompt information. The memory 1003 stores one or more computer programs, and when instructions are invoked and executed by the one or more processors 1002, the electronic device 1000 is enabled to perform the following steps.

The display 1001 displays a first interface, where the first interface includes at least one control and a first folder, the control is displayed outside the first folder, the first folder includes a first page and a second page, the first page includes at least one application icon, the second page includes at least one application icon, and the first page is displayed on the first interface; detects a first operation performed by a user on the first page of the first folder; displays a second interface in response to the first operation, where the second interface includes the at least one control and the second page.

In a possible design, application icons on the second page include a part of application icons on the first page.

In a possible design, the first operation includes any one of the following operations: a slide operation at a position of an $N^{th}$ application icon on the first page of the first folder, where N is a positive integer; a slide operation in a first specified area of the first folder, where the first specified area includes any one of a left edge, a right edge, an upper edge, or a lower edge of the first folder; and a slide operation in any area of the first folder.

In a possible design, when the instructions are invoked and executed by the one or more processors 1002, the electronic device 1000 is enabled to perform the following step:
  displaying the part of the application icons of the first page on the second page of the first folder based on a sliding distance of the first operation in response to the first operation.

In a possible design, a quantity of application icons included in the first folder is greater than a preset quantity.

When the instructions are invoked and executed by the one or more processors 1002, the electronic device 1000 is enabled to perform the following steps:
  detecting a second operation performed by the user at a position of a $P^{th}$ application icon on the first page; and displaying a third interface in response to the second operation, where the third interface includes a first application icon to an $M^{th}$ application icon on the first page, M is greater than the preset quantity, and a quantity of application icons that are in the first folder and that are able to be displayed on the third interface is greater than a quantity of application icons that are able to be displayed on the first page.

In a possible design, when the instructions are invoked and executed by the one or more processors 1002, the electronic device 1000 is enabled to further perform the following steps:
  detecting a third operation performed by the user at a position of a $P^{th}$ application icon on the second page; and displaying a fourth interface in response to the third operation, where the fourth interface includes a first application icon to an $O^{th}$ application icon on the second page, or the fourth interface includes an $L^{th}$ application icon to an $O^{th}$ application icon on the second page, L<P<O, and a quantity of application icons that are in the first folder and that are able to be displayed on the fourth interface is greater than a quantity of application icons that are able to be displayed on the second page.

In a possible design, when the instructions are invoked and executed by the one or more processors 1002, the electronic device 1000 is enabled to perform the following step:
  when the quantity of application icons included in the first folder is greater than the preset quantity, displaying the second interface in response to the first operation.

In a possible design, the preset quantity is 8 or 9.

In a possible design, an icon of a first application is displayed on the first page. When the instructions are invoked and executed by the one or more processors 1002, the electronic device 1000 is enabled to further perform the following steps: detecting a fourth operation performed on the icon of the first application on the first interface; and opening the first application in response to the fourth operation.

In a possible design, the quantity of application icons included in the first folder is greater than the preset quantity, and the first page includes icons displayed in an overlapping manner.

In a possible design, when the instructions are invoked and executed by the one or more processors 1002, the electronic device 1000 is enabled to perform the following step: detecting the first operation performed by the user on the icons displayed in the overlapping manner, where the icons displayed in the overlapping manner are displayed as a plurality of non-overlapped icons on the second interface.

In a possible design, when the instructions are invoked and executed by the one or more processors 1002, the electronic device 1000 is enabled to further perform the following steps: detecting a fifth operation performed by the user on the second page of the first folder; and displaying the first page of the first folder in response to the fifth operation.

In this embodiment of this application, the processor 1002 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module. The software module may be located in the memory 1003. The processor 1002 reads the program instructions from the memory 1003, and completes the steps of the method in combination with the hardware of the processor.

In this embodiment of this application, the memory 1003 may be a non-volatile memory, for example, a hard disk drive (hard disk drive, HDD) or a solid-state drive (solid-state drive, SSD), or may be a volatile memory (volatile memory), for example, a RAM. The memory may alternatively be any other medium that can be configured to carry or store expected program code in an instruction form or a data structure form and that can be accessed by a computer. This is not limited thereto. The memory in this embodiment of this application may alternatively be a circuit or any other apparatus that can implement a storage function, and is configured to store instructions and/or data.

It may be clearly understood by a person skilled in the art that, for convenient and brief description, for a detailed working process of the foregoing apparatus and units, refer to a corresponding process in the foregoing method embodiments, and details are not described herein again.

Based on the foregoing embodiments, this application further provides a computer storage medium. The computer storage medium stores a computer program. When the computer program is executed by a computer, the computer is enabled to perform the display method provided in the foregoing embodiments.

An embodiment of this application further provides a computer program product including instructions. When the computer program product is run on a computer, the computer is enabled to perform the display method provided in the foregoing embodiments.

Embodiments of this application are described with reference to the flowcharts and/or block diagrams of the method, the device (system), and the computer program product according to embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

What is claimed is:

1. A display method, comprising:
displaying, by an electronic device, a first interface comprising a control and a first folder, wherein the control is displayed outside the first folder;
detecting, by the electronic device, a first operation performed on a first page of the first folder, wherein the first page is displayed on the first interface and comprises at least one application icon; and
displaying, by the electronic device based on a quantity of application icons included in the first folder and the detection of the first operation, a second interface or a third interface such that
in case that the quantity of application icons included in the first folder is greater than a preset quantity, the second interface is displayed and comprises the at least one control and a second page of the first folder, the second page comprises at least one application icon; and
in case that the quantity of application icons included in the first folder is less than or equal to the preset quantity, the third interface is displayed and does not comprise the at least one control and the first folder.

2. The method of claim 1, wherein the first operation is a slide operation in any area of the first folder.

3. The method of claim 1, wherein the displaying, by the electronic device, the second interface comprises:
displaying, by the electronic device, part of the application icons of the first page on the second page of the first folder based on a sliding distance of the first operation.

4. The method of claim 1, wherein the preset quantity is 9.

5. The method of claim 1, wherein in case that the quantity of application icons included in the first folder is greater than the preset quantity, the first page comprises application icons displayed in an overlapping manner.

6. The method of claim 5, wherein the detecting, by the electronic device, the first operation performed on the first page of the first folder comprises: detecting, by the electronic device, the first operation performed on the application icons displayed in the overlapping manner; and
wherein the second interface includes part of the application icons displayed in the overlapping manner, the part of the application icons are displayed in non-overlapping manner.

7. The method of claim 1, wherein the first page displayed on the first interface includes first application icons of the preset quantity, and the second page displayed on the second interface includes second application icons belonging to the first folder and being different from the first application icons.

8. The method of claim 1, wherein the method further comprises:
displaying, by the electronic device, the first page of the first folder in response to detecting a third operation performed on the second page of the first folder.

9. An electronic device, wherein the electronic device comprises a display, one or more processors, one or more memories, one or more sensors, a plurality of applications, and one or more computer programs; and
the one or more computer programs are stored in the one or more memories, the one or more computer programs comprise instructions that, when executed by the one or more processors, cause the electronic device to perform:
displaying a first interface comprising at least one control and a first folder, wherein the control is displayed outside the first folder;
detecting a first operation performed on a first page of the first folder, wherein the first page is displayed on the first interface and comprises at least one application icon; and
displaying, based on a quantity of application icons included in the first folder and the first operation, a second interface or a third interface such that:
in case that the quantity of application icons included in the first folder is greater than the preset quantity, the second interface is displayed and comprises the at least one control and a second page of the first folder, the second page comprises at least one application icon;
in case that the quantity of application icons included in the first folder is less than or equal to the preset quantity, the third interface is displayed and does not comprise the at least one control and the first folder.

10. The electronic device of claim 9, wherein the first operation is a slide operation in any area of the first folder.

11. The electronic device of claim 9, wherein the display the second interface comprises:
    display part of the application icons of the first page on the second page of the first folder based on a sliding distance of the first operation.

12. The electronic device of claim 9, wherein the preset quantity is 9.

13. The electronic device of claim 9, wherein in case that the quantity of application icons included in the first folder is greater than the preset quantity, the first page comprises application icons displayed in an overlapping manner.

14. The electronic device of claim 13, wherein the electronic device detects the first operation performed on the application icons displayed in the overlapping manner; and
    wherein the second interface includes part of the application icons displayed in the overlapping manner, the part of the application icons are displayed in non-overlapping manner.

15. The electronic device of claim 9, wherein the first page displayed on the first interface includes first application icons of the preset quantity, and the second page displayed on the second interface includes second application icons belonging to the first folder and being different from the first application icons.

16. The electronic device of claim 9, wherein when the instructions are executed by the one or more processors, the electronic device is further enabled to:
    display the first page of the first folder if the electronic device detects a second operation performed on the second page of the first folder.

17. A non-transitory computer-readable storage medium, wherein the computer-readable storage medium stores instructions, and when the instructions are run on an electronic device, the electronic device is enabled to perform:
    displaying a first interface comprising at least one control and a first folder, wherein the control is displayed outside the first folder;
    detecting a first operation performed on a first page of the first folder, wherein the first page is displayed on the first interface and comprises at least one application icon; and
    displaying, based on a quantity of application icons included in the first folder and the first operation, a second interface or a third interface such that:
    in case that a quantity of application icons included in the first folder is greater than the preset quantity, the second interface is displayed and comprises the at least one control and a second page of the first folder, the second page comprises at least one application icon; and
    in case that the quantity of application icons included in the first folder is less than or equal to the preset quantity, the third interface is displayed and does not comprises the at least one control and the first folder.

18. The computer-readable storage medium of claim 17, wherein the first operation is a slide operation in any area of the first folder.

19. The computer-readable storage medium of claim 17, wherein the detecting the first operation performed on the first page of the first folder comprises: detecting the first operation performed on application icons that are included in the first page and displayed in overlapping manner; and
    wherein the second interface includes part of the application icons displayed in the overlapping manner, the part of the application icons are displayed in non-overlapping manner.

20. The computer-readable storage medium of claim 17, wherein the first page displayed on the first interface includes first application icons of the preset quantity, and the second page displayed on the second interface includes second application icons belonging to the first folder and being different from the first application icons.

* * * * *